United States Patent
Bodin et al.

(10) Patent No.: US 7,231,294 B2
(45) Date of Patent: Jun. 12, 2007

(54) NAVIGATING A UAV

(75) Inventors: William Kress Bodin, Austin, TX (US); Jesse J. W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/692,169

(22) Filed: Oct. 23, 2003

(65) Prior Publication Data
US 2005/0090972 A1  Apr. 28, 2005

(51) Int. Cl.
*G01C 21/00* (2006.01)

(52) U.S. Cl. .............. 701/206; 701/213; 701/200; 701/3; 701/2; 382/106; 382/107; 382/108; 382/154; 343/705; 398/121

(58) Field of Classification Search ........... 701/206, 701/213, 200–202, 23, 3; 340/947, 990; 382/106–108, 154; 398/121
See application file for complete search history.

(56) References Cited

U.S. PATENT DOCUMENTS

| | | | |
|---|---|---|---|
| 5,240,207 A | 8/1993 | Eiband et al. | |
| 5,552,983 A | 9/1996 | Thornbert et al. | |
| 5,559,707 A * | 9/1996 | DeLorme et al. | 701/200 |
| 5,581,250 A | 12/1996 | Khvilivitzky | |
| 5,716,032 A * | 2/1998 | McIngvale | 244/185 |
| 5,802,492 A * | 9/1998 | DeLorme et al. | 455/456.5 |
| 5,890,441 A | 4/1999 | Swinson et al. | |
| 6,006,158 A * | 12/1999 | Pilley et al. | 701/120 |
| 6,056,237 A | 5/2000 | Woodland | |
| 6,122,572 A * | 9/2000 | Yavnai | 701/23 |
| 6,130,705 A | 10/2000 | Lareau et al. | |
| 6,182,005 B1 * | 1/2001 | Pilley et al. | 701/120 |
| 6,195,609 B1 * | 2/2001 | Pilley et al. | 701/120 |
| 6,219,004 B1 | 4/2001 | Johnson | |
| 6,314,363 B1 * | 11/2001 | Pilley et al. | 701/120 |
| 6,321,558 B1 * | 11/2001 | Pruse | 62/324.6 |
| 6,377,875 B1 | 4/2002 | Schwaerzler | |
| 6,498,968 B1 | 12/2002 | Bush | |
| 6,535,793 B2 * | 3/2003 | Allard | 700/259 |
| 6,584,382 B2 * | 6/2003 | Karem | 701/3 |
| 6,626,398 B1 * | 9/2003 | Cox et al. | 244/45 R |

(Continued)

OTHER PUBLICATIONS

Sutcliffe, et al.; Decentralised Data Fusion Applied to a Network of Unmanned Aerial Vehicles; Inspec AN 7289965; Feb. 2002; pp. 71-76; Piscataway, NJ; USA.

(Continued)

*Primary Examiner*—Cuong Nguyen
(74) *Attorney, Agent, or Firm*—Diana L. Roberts; H. Artoush Ohanian; Biggers & Ohanian, LLP.

(57) ABSTRACT

Exemplary embodiments of the present invention include a method for navigating a UAV. Such embodiments include receiving in a remote control device a user's selection of a GUI map pixel that represents a waypoint for UAV navigation. The pixel has a location on the GUI. Such embodiments also include mapping the pixel's location on the GUI to Earth coordinates of the waypoint, transmitting the coordinates of the waypoint to the UAV, reading a starting position from a GPS receiver on the UAV, and piloting the UAV, under control of a navigation computer on the UAV, from the starting position to the waypoint in accordance with a navigation algorithm.

33 Claims, 16 Drawing Sheets

U.S. PATENT DOCUMENTS

| | | | |
|---|---|---|---|
| 6,813,559 B1* | 11/2004 | Bodin et al. | 701/206 |
| 6,845,297 B2* | 1/2005 | Allard | 700/259 |
| 6,856,894 B1* | 2/2005 | Bodin et al. | 701/206 |
| 7,107,148 B1* | 9/2006 | Bodin et al. | 701/206 |
| 2001/0035995 A1 | 11/2001 | Ruggiero | |
| 2001/0037163 A1* | 11/2001 | Allard | 700/245 |
| 2003/0083804 A1* | 5/2003 | Pilley | 701/120 |
| 2003/0182052 A1* | 9/2003 | DeLorme et al. | 701/201 |
| 2003/0216834 A1* | 11/2003 | Allard | 700/245 |
| 2004/0128065 A1* | 7/2004 | Taylor et al. | 701/201 |
| 2005/0090945 A1* | 4/2005 | Bodin et al. | 701/2 |
| 2005/0090972 A1* | 4/2005 | Bodin et al. | 701/206 |
| 2005/0094851 A1* | 5/2005 | Bodin et al. | 382/106 |
| 2006/0167596 A1* | 7/2006 | Bodin et al. | 701/3 |
| 2006/0167597 A1* | 7/2006 | Bodin et al. | 701/3 |
| 2006/0167599 A1* | 7/2006 | Bodin et al. | 701/16 |
| 2006/0167622 A1* | 7/2006 | Bodin et al. | 701/206 |
| 2006/0217877 A1* | 9/2006 | Bodin et al. | 701/206 |

OTHER PUBLICATIONS

Johnson, et al; Improving Geolocation and Spatial Accuracies with the Modular Integrated Avionics Group; Inspec AN 5467118; pp. 88-97; Apr. 1996; SPIE-Int. Soc. Opt.; England.

Gunapala, et al.; QWIP Technology for Both Military and Civilian Applications; Inspec AN 7255522; Apr. 2001; pp. 498-505; SPIE-Int. Soc. Opt.; England.

Spenny, et al; Closely Supervised Control of a Target-Steered UAV; Inspec AN 6652724;Sep. 1999; pp. 179-190; SPIE-Int. Soc. Opt.; England.

RQ-1 Predator Unmanned Aerial Vehicle; May 2002; pp. 1-3; U.S. Air Force Fact Sheet; USA.

Gormley, et al; Controlling Unmanned Air Vehicles: New Challenges; Mar. 2003; pp. 1-21; Commissioned by the Non-Proliferation Education Center; USA.

Young; Unmanned Aerial Vehicles Web Site; pp. 1-2; NASA GSFC/Wallops Flight Facility, Wallops Island, VA; USA.

Stellman, et al.; War Horse; Apr. 2001; Inspec. AN 7295892; vol. 4379; pp. 339-346; SPIE-Int. Soc. Opt.; USA.

Dittrich, et al.; 21st Digital Avionics Systems Conference; Oct. 2002; Inspec. AN 7614545; vol. 2; IEEE; Piscataway, NJ; USA.

Dittrich; Design and Integration of an Unmanned Aerial Vehicle Navigation System; Thesis; May 2002; pp. i-52; Georgia Institute of Technology; USA.

Somers; Unmanned Aerial Vehicle—Demonstration of Autonomous Flight, 09-9822; 1999 IR&D Home; pp. 1-4; USA.

Brown, et al.; Airporne Reconnaissance XXIII; Jul. 1999; pp. 2-8; vol. 3751; SPIE-Int. Soc. Opt; England.

Nettleton, et al.; Multiple Platform Localization and Map Building; Nov. 2000; pp. 337-347; Inspec AN 6979413; SPEI-Int. Soc. Opt. Eng; US.

Schumacher et al.; Adaptive Control of UAVs in Close-coupled Formation Flight; 2000; pp. 849-853; Insp An 6770904; vol. 6 Danvers, MA; US.

Singh et al; Adaptive Feedback Linearizing Nonlinear Close Formation Control of UAVs; 2000; pp. 854-858; Inspec AN 6770905; vol. 2; Danvers, Ma; US.

21st Digital Avionics Systems Conference; 2002; Inspec AN 7614402; vol. 1; IEEE; Piscataway, NJ; US.

Hallberg, et al.; Development of a Flight Test Systems for Unmanned Air Vehicles; Feb. 1999; pp. 55-65; IEEE vol. 19; Inspec AN 6176739; Monterey, CA; US.

Shiller, et al.; Mission Adaptable Autonomous Vehicles; 1991; pp. 143-150; Inspec AN 4208922; Newton, MA; US.

Airborne Autonomous Systems . . . where information technology and aviatin meet; Time Magazine; May 22, 2000; pp. 1-7; USA.

Somers, Unmanned Aerial Vehicle—Demonstration of Autonomous Flight, 09-9822; 1999 IR&D Home; pp. 1-4; USA.

Fishell; Airporne Reconnaissance XXIII, Jul. 1999, pp. 2-8; vol. 3751; SPIE-Int. Soc. Opt; England.

* cited by examiner

NAVIGATING A UAV

BACKGROUND OF THE INVENTION

1. Field of the Invention

The field of the invention is data processing, or, more specifically, methods, systems, and products for navigating an unmanned aerial vehicle ("UAV").

2. Description of Related Art

Many forms of UAV are available in prior art, both domestically and internationally. Their payload weight carrying capability, their accommodations (volume, environment), their mission profiles (altitude, range, duration), and their command, control and data acquisition capabilities vary significantly. Routine civil access to these various UAV assets is in an embryonic state.

Conventional UAVs are typically manually controlled by an operator who may view aspects of a UAV's flight using cameras installed on the UAV with images provided through downlink telemetry. Navigating such UAVs from a starting position to one or more waypoints requires an operator to have specific knowledge of the UAV's flight, including such aspects as starting location, the UAV's current location, waypoint locations, and so on. Operators of prior art UAVs usually are required generally to manually control the UAV from a starting position to a waypoint with little aid from automation. There is therefore an ongoing need for improvement in the area of UAV navigations.

SUMMARY OF THE INVENTION

Methods, systems, and products are described for UAV navigation that enable an operator to input a single interface operation, a mouseclick or joystick button click, thereby selecting GUI pixel from a displayed map of the surface of the Earth. The selected pixel maps to a waypoint. The waypoint is uploaded through uplink telemetry to a UAV which calculates a heading and flies, according to a navigation algorithm, a course to the waypoint. The heading is not necessarily the course if wind is present, depending on the navigation algorithm chosen for the flight. All this occurs with a single keystroke or mouseclick from the operator.

The operator's remote control device from which the pixel is selected is enabled according to embodiments of the present invention to be very thin. Often the remote control device can be a browser in a laptop or personal computer or a microbrowser in a PDA enhanced only with client-side scripting sufficient to map a pixel to a waypoint and transmit the waypoint to the UAV. The UAV itself generally comprises the intelligence, the navigation algorithms, a web server to download map images to a client browser in a remote control device, a repository of Landsat maps from which HTML screens are formulated for download to the remote control device, and so on.

In addition to uplinking a single waypoint, operators of remote control devices according to embodiments of the present invention are enabled to enter through a user interface and upload to the UAV many waypoints which taken in sequence form an entire mission for a UAV that flies from waypoint to waypoint, eventually returning to a starting point. In addition to providing for a mission route comprising many waypoints, typical embodiments also support 'macros,' sets of UAV instructions associated with waypoints. Such UAV instructions can include, for example, instructions to orbit, take photographs or stream video, and continue flying a route or mission to a next waypoint. Because waypoints are entered with selected pixels and macros may be created by selecting UAV instructions from a pull down menu in a GUI, complex missions may be established with a few keystrokes of mouseclicks on an interface of a remote control device. Because the waypoints and UAV instructions are uploaded and stored on the UAV along with the navigation algorithms needed to travel from waypoint to waypoint, the remote control device may lose communications with the UAV or even be destroyed completely, and the UAV will simply continue its mission.

More particularly, methods, systems, and products are disclosed in this specification for navigating a UAV. Typical embodiments include receiving in a remote control device a user's selection of a GUI map pixel that represents a waypoint for UAV navigation. The pixel has a location on the GUI. Such embodiments also include mapping the pixel's location on the GUI to Earth coordinates of the waypoint, transmitting the coordinates of the waypoint to the UAV, reading a starting position from a GPS receiver on the UAV, and piloting the UAV, under control of a navigation computer on the UAV, from the starting position to the waypoint in accordance with a navigation algorithm.

Many embodiments of the present invention include receiving user selections of a multiplicity of GUI map pixels representing waypoints. Each pixel has a location on the GUI. Many such embodiments include mapping each pixel location to Earth coordinates of a waypoint, assigning one or more UAV instructions to each waypoint, transmitting the coordinates of the waypoints and the UAV instructions to the UAV, storing the coordinates of the waypoints and the UAV instructions in computer memory on the UAV, piloting the UAV to each waypoint in accordance with one or more navigation algorithms, and operating the UAV at each waypoint in accordance with the UAV instructions for each waypoint.

In many embodiments, mapping the pixel's location on the GUI to Earth coordinates of the waypoint includes mapping pixel boundaries of the GUI map to Earth coordinates, identifying a range of latitude and a range of longitude represented by each pixel, and locating a region on the surface of the Earth in dependence upon the boundaries, the ranges, and the location of the pixel on the GUI map. In some embodiments, locating a region on the surface of the Earth in dependence upon the boundaries, the ranges, and the location of the pixel on the GUI map includes multiplying the range of longitude represented by each pixel by a column number of the selected pixel, yielding a first multiplicand, multiplying the range of longitude represented by each pixel by 0.5, yielding a second multiplicand, adding the first and second multiplicands to an origin longitude of the GUI map, multiplying the range of latitude represented by each pixel by a row number of the selected pixel, yielding a third multiplicand, multiplying the range of latitude represented by each pixel by 0.5, yielding a fourth multiplicand, and adding the third and fourth multiplicands to an origin latitude of the GUI map. In many embodiments, piloting in accordance with a navigation algorithm includes periodically repeating the steps of reading from the GPS receiver a current position of the UAV, calculating a heading from the current position to the waypoint, turning the UAV to the heading, and flying the UAV on the heading.

In some embodiments, piloting in accordance with a navigation algorithm includes identifying a cross track between the starting point and the waypoint, and repeatedly carrying out the steps of: reading from the GPS receiver a current position of the UAV, calculating a shortest distance between the current position and the cross track. If the shortest distance between the current position and the cross track is greater than a threshold distance, the method includes piloting the UAV toward the cross track, and, upon arriving at the cross track, piloting the UAV in a cross track direction toward the waypoint. In some embodiments, calculating a shortest distance between the current position and the cross track includes: calculating the distance from the current position to the waypoint, calculating the angle between a direction from the current position to the waypoint and a cross track direction, calculating the tangent of the angle, and multiplying the tangent of the angle by the distance from the current position to the waypoint.

In many embodiments, piloting in accordance with a navigation algorithm includes identifying a cross track having a cross track direction between the starting point and the waypoint, and repeatedly carrying out the steps of: reading from the GPS receiver a current position of the UAV, calculating an angle between the direction from the current position to the waypoint and a cross track direction, and if the angle is greater than a threshold angle, piloting the UAV toward the cross track, and, upon arriving at the cross track, piloting the UAV in the cross track direction. In some embodiments, the threshold angle is a variable whose value varies in dependence upon a distance between the UAV and the waypoint. In many embodiments, piloting in accordance with a navigation algorithm includes periodically repeating the steps of: reading from the GPS receiver a current position of the UAV, calculating a direction to the waypoint from the current position, calculating a heading in dependence upon wind speed, wind direction, air speed, and the direction to the waypoint, turning the UAV to the heading, and flying the UAV on the heading.

Some embodiments include identifying a cross track and calculating a cross track direction from the starting position to the waypoint. In such embodiments, piloting in accordance with a navigation algorithm includes periodically repeating the steps of: reading from the GPS receiver a current position of the UAV, calculating a shortest distance between the cross track and the current position, and if the shortest distance between the cross track and the current position is greater than a threshold distance, piloting the UAV to the cross track, and, upon arriving at the cross track: reading from the GPS receiver a new current position of the UAV, calculating, in dependence upon wind speed, wind direction, air speed, and the cross track direction, a new heading, turning the UAV to the new heading; and flying the UAV on the new heading.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
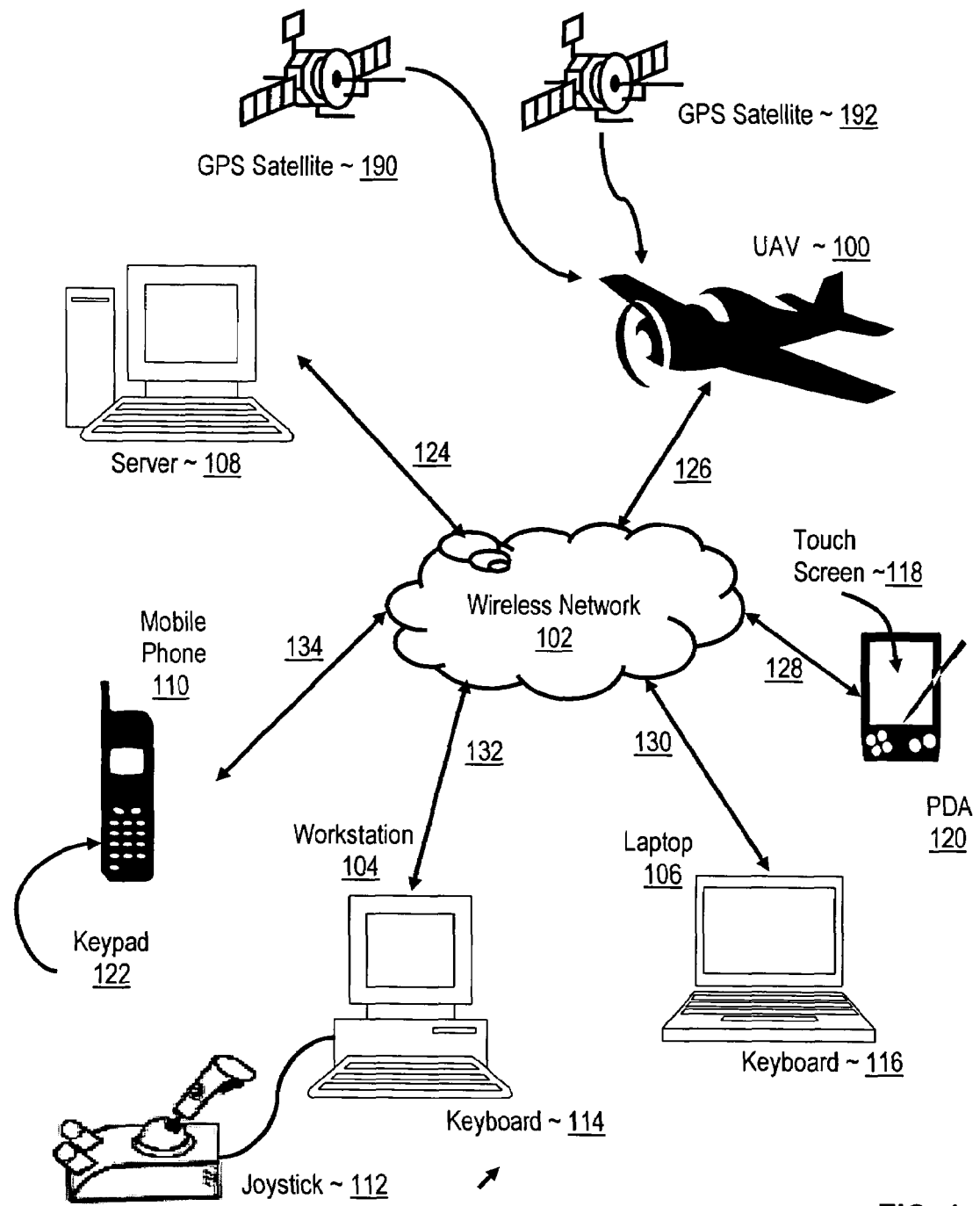
FIG. 1 sets forth a system diagram illustrating relations among components of an exemplary system for navigating a UAV.

The present invention is described to a large extent in this specification in terms of methods for navigating a UAV. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Air speed" means UAV air speed, the speed of the UAV through the air.

A "cross track" is a fixed course from a starting point directly to a waypoint. A cross track has a direction, a 'cross track direction,' that is the direction straight from a starting point to a waypoint. That is, a cross track direction is the heading that a UAV would fly directly from a starting point to a waypoint in the absence of wind.

"GUI" means graphical user interface, a display means for a computer screen.

"Heading" means the compass heading of the UAV. "Course" means the direction of travel of the UAV over the ground. That is, a "course" in this specification is what is called, in some lexicons of air navigation, a 'track.' In the absence of wind, or in the presence of a straight tailwind or straight headwind, the course and the heading are the same direction. In the presence of crosswind, the course and the heading are different directions.

"Position" refers to a location in the air or over the ground. 'Position' is typically specified as Earth coordinates, latitude and longitude. A specification of position may also include altitude.

A "waypoint" is a position chosen as a destination for navigation of a route. A route has one or more waypoints. That is, a route is composed of waypoints, including at least one final waypoint, and one or more intermediate waypoints.

"TDMA" stands for Time Division Multiple Access, a technology for delivering digital wireless service using time-division multiplexing. TDMA works by dividing a radio frequency into time slots and then allocating slots to multiple calls. In this way, a single frequency can support multiple, simultaneous data channels. TDMA is used by GSM.

"GSM" stands for Global System for Mobile Communications, a digital cellular standard. GSM at this time is the de facto standard for wireless digital communications in Europe and Asia.

"CDPD" stands for Cellular Digital Packet Data, a data transmission technology developed for use on cellular phone frequencies. CDPD uses unused cellular channels to transmit data in packets. CDPD supports data transfer rates of up to 19.2 Kbps.

"GPRS" stands for General Packet Radio Service, a standard for wireless data communications which runs at speeds up to 150 Kbps, compared with current GSM systems which cannot support more than about 9.6 Kbps. GPRS, which supports a wide range of speeds, is an efficient use of limited bandwidth and is particularly suited for sending and receiving small bursts of data, such as e-mail and Web browsing, as well as large volumes of data.

"EDGE" stands for Enhanced Data Rates for GSM Evolution, a standard for wireless data communications supporting data transfer rates of more than 300 Kbps. GPRS and EDGE are considered interim steps on the road to UMTS.

"UMTS" stands for Universal Mobile Telecommunication System, a standard for wireless data communications supporting data transfer rates of up to 2 Mpbs. UMTS is also referred to W-CDMA for Wideband Code Division Multiple Access.

Navigating a UAV

Methods, systems, and products for navigating a UAV are explained with reference to the accompanying drawings, beginning with FIG. 1. FIG. 1 sets forth a system diagram illustrating relations among components of an exemplary system for navigating a UAV. The system of FIG. 1 includes UAV (100) which includes a GPS (Global Positioning System) receiver (not shown) that receives a steady stream of GPS data from satellites (190, 192). For convenience of explanation, only two GPS satellites are shown in FIG. 1, although the GPS satellite network in fact includes 24 GPS satellites.

The system of FIG. 1 operates to navigate a UAV by receiving in a remote control device a user's selection of a GUI map pixel that represents a waypoint for UAV navigation. Each such pixel has a location on a GUI map, typically specified as a row and column position. Examples of remote control devices in FIG. 1 include mobile telephone (110), workstation (104), laptop computer (116), and PDA (Personal Digital Assistant) (120). Each such remote control device is capable of supporting a GUI display of a map of the surface of the Earth in which each pixel on the GUI map represents a position on the Earth.

Each remote control device also supports at least one user input device through which a user may enter the user's selection of a pixel. Examples of user input devices in the system of FIG. 1 include telephone keypad (122), workstation keyboard (114), workstation joystick (112), laptop keyboard (116) and PDA touch screen (118).

The system of FIG. 1 typically is capable of operating a remote control device to map the pixel' location on the GUI to Earth coordinates of a waypoint and to transmit the coordinates of the waypoint to the UAV (100). In the example of FIG. 1, waypoint coordinates are generally transmitted from remote control devices to the UAV through wireless network (102). Wireless network (102) is implemented using any wireless data transmission technology as will occur to those of skill in the art including, for example, TDMA, GSM, CDPD, GPRS, EDGE, and UMTS. In a preferred embodiment, a data communications link layer is implemented using one of these technologies, a data communications network layer is implemented with the Internet Protocol ("IP"), and a data communications transmission layer is implemented using the Transmission Control Protocol ("TCP"). In such systems, telemetry between the UAV and remote control devices, including waypoint coordinates, are transmitted using an application-level protocol such as, for example, the HyperText Transmission Protocol ("HTTP"), the Wireless Application Protocol ("WAP"), the Handheld Device Transmission Protocol ("HDTP"), or any other data communications protocol as will occur to those of skill in the art.

The system of FIG. 1 typically is capable of operating a UAV to read a starting position from a GPS receiver (reference 186 on FIG. 2) on the UAV and pilot the UAV, under control of a navigation computer on the UAV, from a starting position to a waypoint in accordance with a navigation algorithm.

Figure 2:
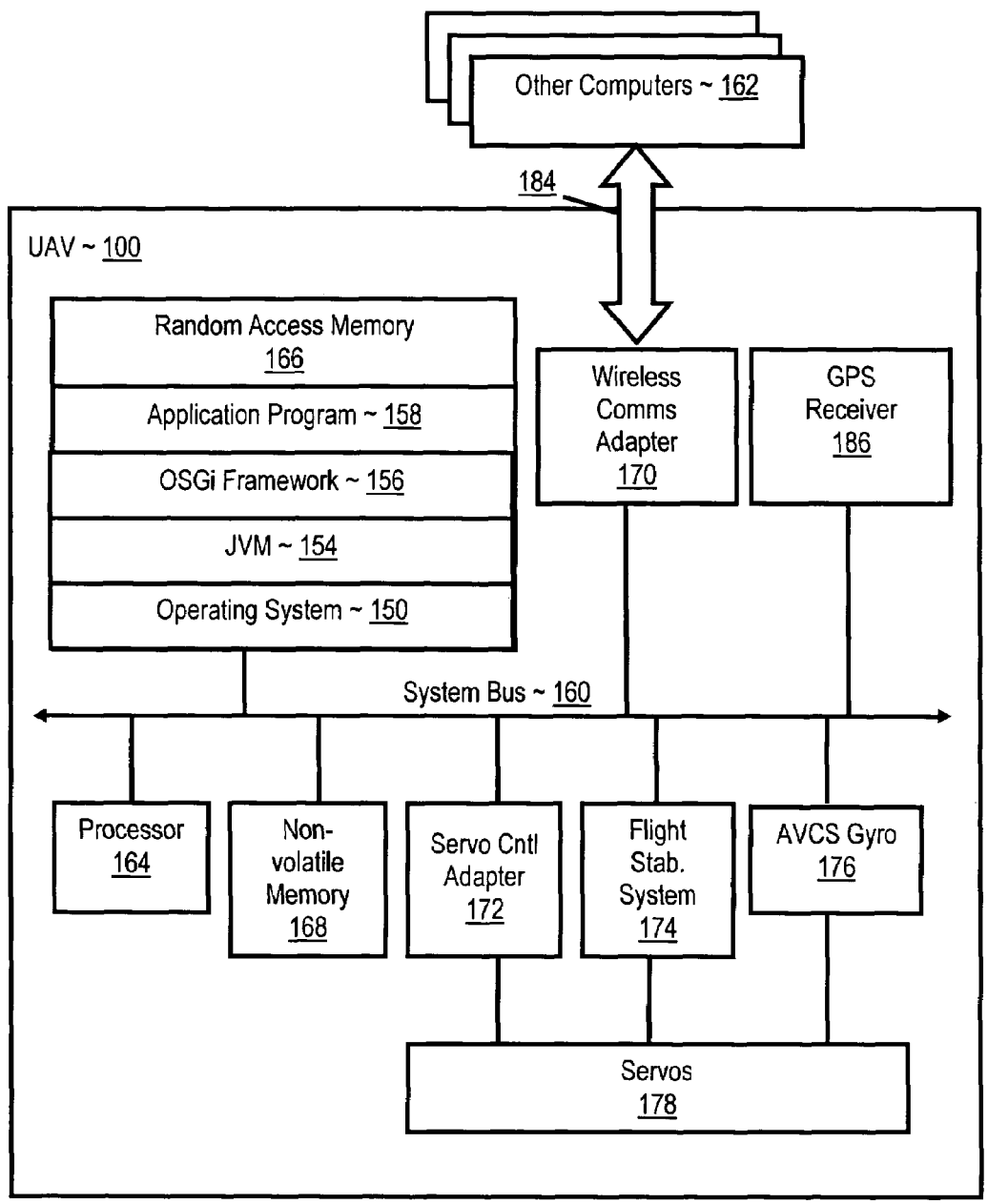
FIG. 2 is a block diagram of an exemplary UAV showing relations among components of included automated computing machinery.

UAVs according to embodiments of the present invention typically include, not only an aircraft, but also automated computing machinery capable of receiving GPS data, operating telemetry between the UAV and one or more remote control devices, and navigating a UAV among waypoints. FIG. 2 is a block diagram of an exemplary UAV showing relations among components of included automated computing machinery. In FIG. 2, UAV (100) includes a processor (164), also typically referred to as a central processing unit or 'CPU.' The processor may be a microprocessor, a programmable control unit, or any other form of processor useful according to the form factor of a particular UAV as will occur to those of skill in the art. Other components of UAV (100) are coupled for data transfer to processor (164) through system bus (100).

UAV (100) includes random access memory or 'RAM' (166). Stored in RAM (166) is an application program (158) that implements inventive methods according to embodiments of the present invention. In some embodiments, the application programming runs on an OSGi services framework (156). OSGi Stands for 'Open Services Gateway Initiative.' The OSGi specification is a Java-based application layer framework that provides vendor neutral application layer APIs and functions. An OSGi service framework (126) is written in Java and therefore typically runs on a Java Virtual Machine (JVM) (154) which in turn runs on an operating system (150). Examples of operating systems useful in UAVs according to the present invention include Unix, AIX™, and Microsoft Windows™.

In OSGi, the framework is a hosting platform for running 'services'. Services are the main building blocks for creating applications according to the OSGi. A service is a group of Java classes and interfaces that implement a certain feature. The OSGi specification provides a number of standard services. For example, OSGi provides a standard HTTP service that can respond to requests from HTTP clients, such as, for example, remote control devices according to embodiments of the present invention. That is, such remote control devices are enabled to communicate with a UAV having an HTTP service by use of data communications messages in the HTTP protocol.

Services in OSGi are packaged in 'bundles' with other files, images, and resources that the services need for execution. A bundle is a Java archive or 'JAR' file including one or more service implementations, an activator class, and a manifest file. An activator class is a Java class that the service framework uses to start and stop a bundle. A manifest file is a standard text file that describes the contents of the bundle.

The services framework in OSGi also includes a service registry. The service registry includes a service registration including the service's name and an instance of a class that implements the service for each bundle installed on the framework and registered with the service registry. A bundle may request services that are not included in the bundle, but are registered on the framework service registry. To find a service, a bundle performs a query on the framework's service registry.

In the UAV (100) of FIG. 2, software programs and other useful information may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

UAV (100) includes communications adapter (170) implementing data communications connections (184) to other computers (162), which may be wireless networks, satellites, remote control devices, servers, or others as will occur to those of skill in the art. Communications adapters implement the hardware level of data communications connections through which UAVs transmit wireless data communications. Examples of communications adapters include wireless modems for dial-up connections through wireless telephone networks.

UAV (100) includes servos (178). Servos (178) are proportional control servos that convert digital control signals from system bus (160) into actual proportional displacement of flight control surfaces, ailerons, elevators, and the rudder. The displacement of flight control surfaces is 'proportional' to values of digital control signals, as opposed to the 'all or nothing' motion produces by some servos. In this way, ailerons, for example, may be set to thirty degrees, sixty degrees, or any other supported angle rather than always being only neutral or fully rotated. Several proportional control servos useful in various UAVs according to embodiments of the present invention are available from Futaba®.

UAV (100) includes a servo control adapter (172). A servo control adapter (172) is multi-function input/output servo motion controller capable of controlling several servos. An example of such a servo control adapter is the "IOSERVO" model from National Control Devices of Osceola, Mo. The IOSERVO is described on National Control Devices website at www.controlanything.com.

UAV (100) includes a flight stabilizer system (174). A flight stabilizer system is a control module that operates servos (178) to automatically return a UAV to straight and level flight, thereby simplifying the work that must be done by navigation algorithms. An example of a flight stabilizer system useful in various embodiments of UAVs according to the present invention is model Co-Pilot™ from FMA, Inc., of Frederick, Md. The Co-Pilot flight stabilizer system identifies a horizon with heat sensors, identifies changes in aircraft attitude relative to the horizon, and sends corrective signals to the servos (178) to keep the UAV flying straight and level.

UAV (100) includes an AVCS gyro (176). An AVCS gryo is an angular vector control system gyroscope that provides control signal to the servos to counter undesired changes in attitude such as those caused by sudden gusts of wind. An example of an AVCS gyro useful in various UAVs according to the present invention is model GYA350 from Futaba®.

Figure 3:
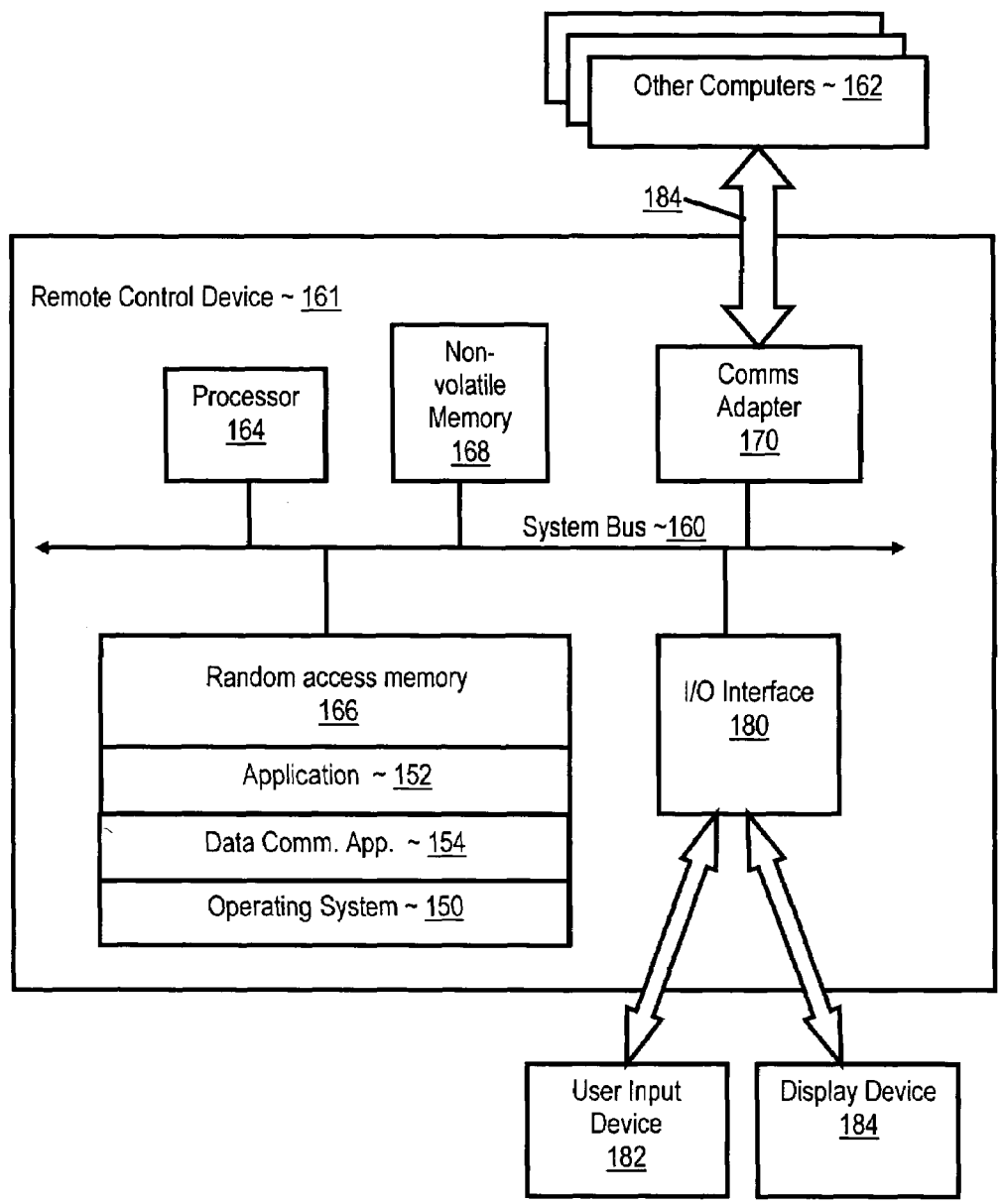
FIG. 3 is a block diagram of an exemplary remote control device showing relations among components of included automated computing machinery.

Remote control devices according to embodiments of the present invention typically comprise automated computing machinery capable of receiving user selections of pixel on GUI maps, mapping the pixel to a waypoint location, and transmitting the waypoint location to a UAV. FIG. 3 is a block diagram of an exemplary remote control device showing relations among components of included automated computing machinery. In FIG. 3, remote control device (161) includes a processor (164), also typically referred to as a central processing unit or 'CPU.' The processor may be a microprocessor, a programmable control unit, or any other form of processor useful according to the form factor of a particular remote control device as will occur to those of skill in the art. Other components of remote control device (161) are coupled for data transfer to processor (164) through system bus (160).

Remote control device (161) includes random access memory or 'RAM' (166). Stored in RAM (166) an application program 152 that implements inventive methods of the present invention. In some embodiments, the application program (152) is OSGi compliant an therefore runs on an OSGi services framework installed (not shown) on a JVM (not shown). In addition, software programs and further information for use in implementing methods of navigating a UAV according to embodiments of the present invention may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

Remote control device (161) includes communications adapter (170) implementing data communications connections (184) to other computers (162), including particularly computes on UAVs. Communications adapters implement the hardware level of data communications connections through which remote control devices communicate with UAVs directly or through networks. Examples of communications adapters include modems for wired dial-up connections, Ethernet (IEEE 802.3) adapters for wired LAN connections, 802.11b adapters for wireless LAN connections, and Bluetooth adapters for wireless microLAN connections.

The example remote control device (161) of FIG. 3 includes one or more input/output interface adapters (180). Input/output interface adapters in computers implement user-oriented input/output through, for example, software drivers and computer hardware for controlling output to display devices (184) 180 such as computer display screens, as well as user input from user input devices (182) such as keypads, joysticks, keyboards, and touch screens.

Figure 4:
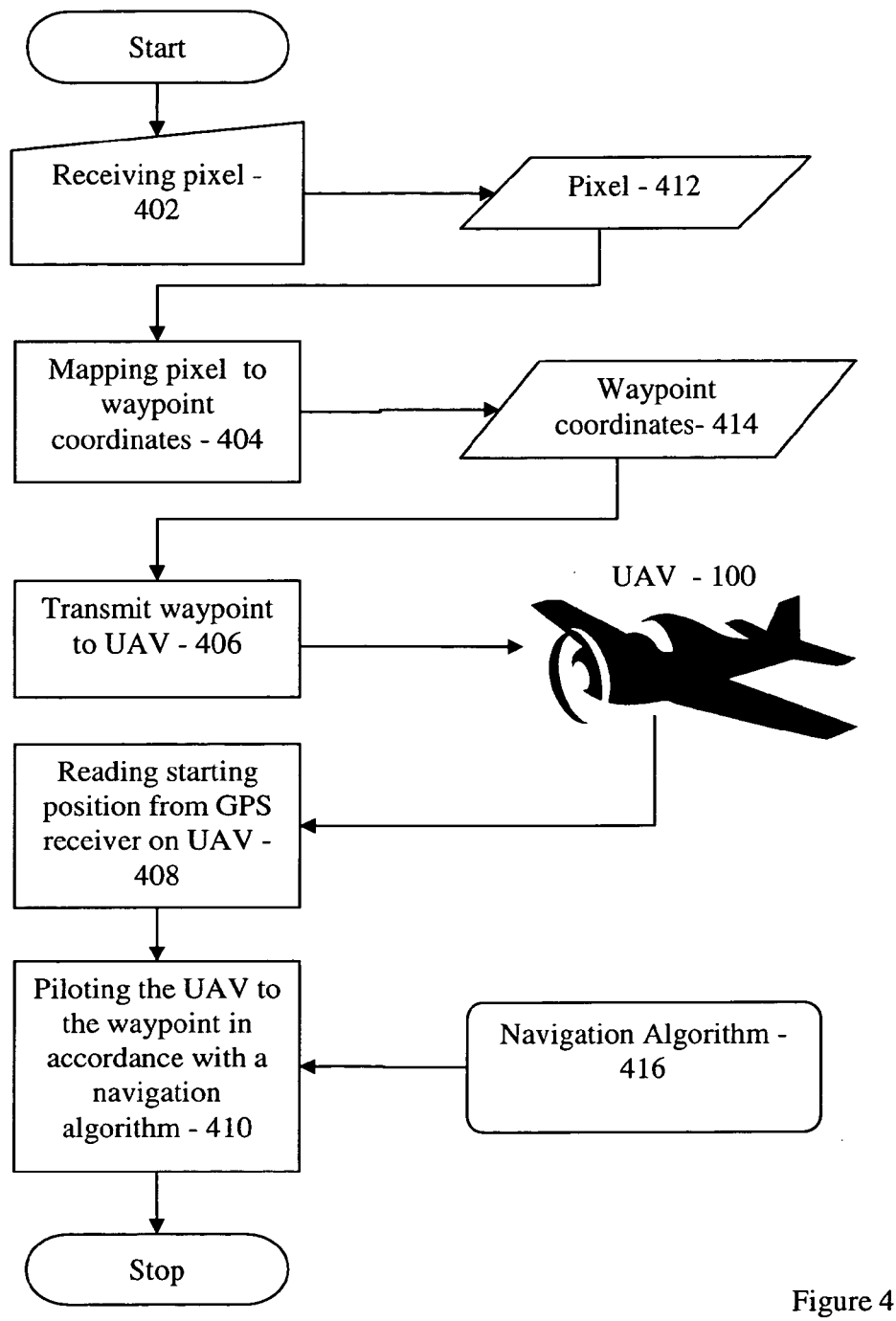
FIG. 4 sets forth a flow chart illustrating an exemplary method for navigating a UAV that includes receiving in a remote control device a user's selection of a GUI map pixel that represents a waypoint for UAV navigation.

FIG. 4 sets forth a flow chart illustrating an exemplary method for navigating a UAV that includes receiving (402) in a remote control device a user's selection of a GUI map pixel (412) that represents a waypoint for UAV navigation. The pixel has a location on the GUI. Such a GUI map display has many pixels, each of which represents at least one position on the surface of the Earth. A user selection of a pixel is normal GUI operations to take a pixel location, row and column, from a GUI input/output adapter driven by a user input device such as a joystick or a mouse. The remote control device can be a traditional 'ground control station,' an airborne PDA or laptop, a workstation in Earth orbit, or any other control device capable of accepting user selections of pixels from a GUI map.

The method of FIG. 4 includes mapping (404) the pixel's location on the GUI to Earth coordinates of the waypoint (414). As discussed in more detail below with reference to FIG. 5, mapping (404) the pixel's location on the GUI to Earth coordinates of the waypoint (414) typically includes mapping pixel boundaries of the GUI map to corresponding Earth coordinates and identifying a range of latitude and a range of longitude represented by each pixel. Mapping (404) the pixel's location on the GUI to Earth coordinates of the waypoint (414) also typically includes locating a region on the surface of the Earth in dependence upon the boundaries, the ranges, and the location of the pixel on the GUI map.

The method of FIG. 4 also includes transmitting (406) the coordinates of the waypoint to the UAV (100). Transmitting (406) the coordinates of the waypoint to the UAV (100) may be carried out by use of any data communications protocol, including, for example, transmitting the coordinates as form data, URI encoded data, in an HTTP message, a WAP message, an HDML message, or any other data communications protocol message as will occur to those of skill in the art.

The method of FIG. 4 also includes reading (408) a starting position from a GPS receiver on the UAV (100) and piloting (410) the UAV, under control of a navigation computer on the UAV, from the starting position to the waypoint in accordance with a navigation algorithm (416). Methods of piloting a UAV according to a navigation algorithm are discussed in detail below in this specification.

Macros

Although the flow chart of FIG. 4 illustrates navigating a UAV to a single waypoint, as a practical matter, embodiments of the present invention support navigating a UAV along a route having many waypoints, including a final waypoint and one or more intermediate waypoints. That is, methods of the kind illustrated in FIG. 4 may also include receiving user selections of a multiplicity of GUI map pixels representing waypoints, where each pixel has a location on the GUI and mapping each pixel location to Earth coordinates of a waypoint.

Such methods of navigating a UAV can also include assigning one or more UAV instructions to each waypoint and transmitting the coordinates of the waypoints and the UAV instructions to the UAV. A UAV instruction typically includes one or more instructions for a UAV to perform a task in connection with a waypoint. Exemplary tasks include turning on or off a camera installed on the UAV, turning on or off a light installed on the UAV, orbiting a waypoint, or any other task that will occur to those of skill in the art.

Such exemplary methods of navigating a UAV also include storing the coordinates of the waypoints and the UAV instructions in computer memory on the UAV, piloting the UAV to each waypoint in accordance with one or more navigation algorithms, and operating the UAV at each waypoint in accordance with the UAV instructions for each waypoint. UAV instructions to perform tasks in connection with a waypoint may be encoded in, for example, XML (the extensible Markup Language) as shown in the following exemplary XML segment:

```
<UAV-Instructions>
    <macro>
        <waypoint> 33° 44' 10" N 30° 15' 50" W </waypoint>
        <instruction> orbit </instruction>
        <instruction> videoCameraON </instruction>
        <instruction> wait30minutes </instruction>
        <instruction> videoCameraOFF </instruction>
        <instruction> nextWaypoint </instruction>
    </macro>
    <macro> </macro>
    <macro> </macro>
    <macro> </macro>
<UAV-instructions>
```

This XML example has a root element named 'UAV-instructions.' The example contains several subelements named 'macro.' One 'macro' subelement contains a waypoint location representing an instruction to fly to 33° 44' 10" N 30° 15' 50" W. That macro subelement also contains several instructions for tasks to be performed when the UAV arrives at the waypoint coordinates, including orbiting around the waypoint coordinates, turning on an on-board video camera, continuing to orbit for thirty minutes with the camera on, turning off the video camera, and continuing to a next waypoint. Only one macro set of UAV instructions is shown in this example, but that is not a limitation of the invention. In fact, such sets of UAV instructions may be of any useful size as will occur to those of skill in the art.

Pixel Mapping

Figure 5:
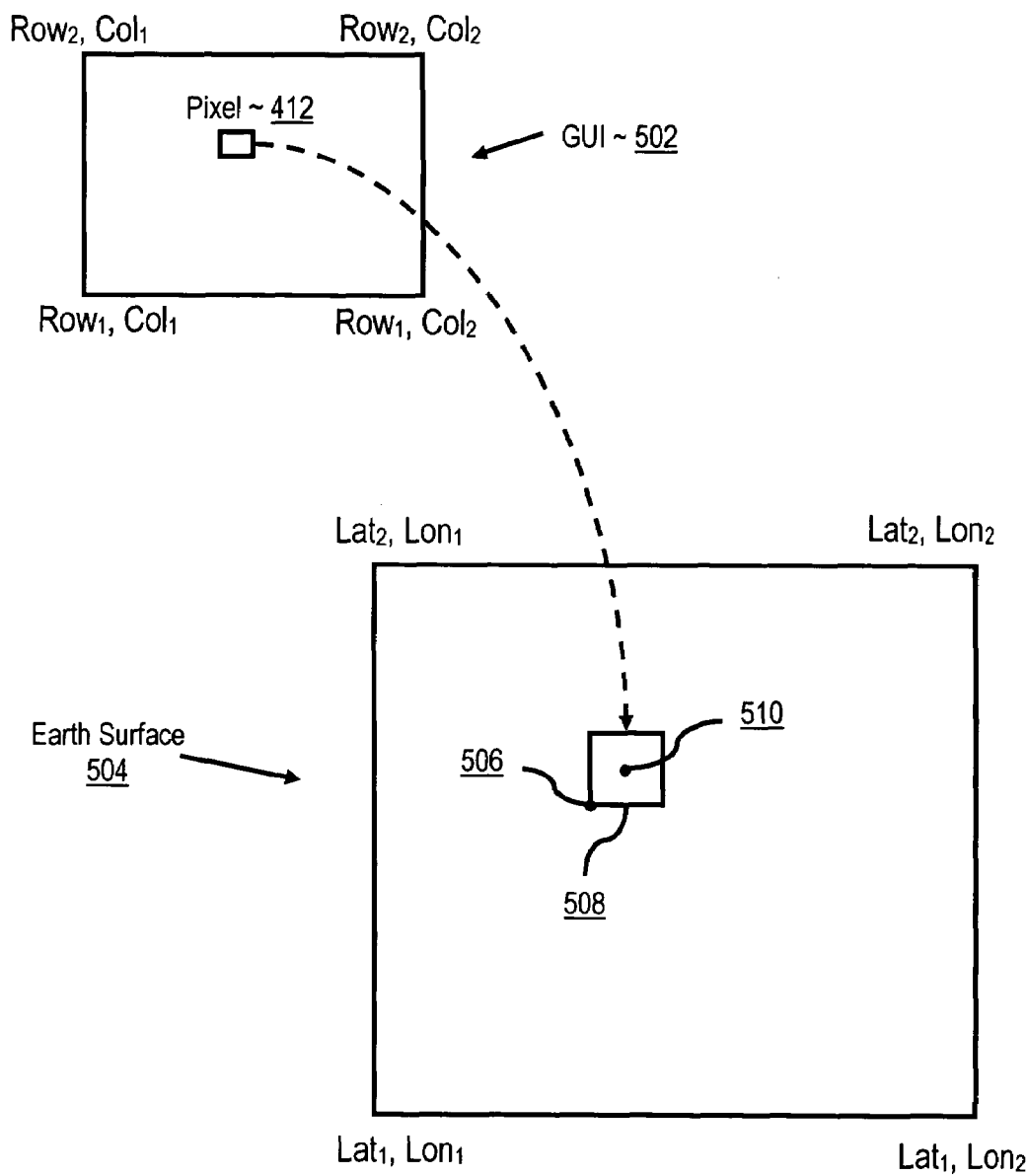
FIG. 5 sets forth a block diagram that includes a GUI displaying a map and a corresponding area of the surface of the Earth.

For further explanation of the process of mapping pixels' locations to Earth coordinates, FIG. 5 sets forth a block diagram that includes a GUI (502) displaying a map (not shown) and a corresponding area of the surface of the Earth (504). The GUI map has pixel boundaries identified as Row$_1$, Col$_1$; Row$_1$, Col$_{100}$; Row$_{100}$, Col$_{100}$; and Row$_{100}$, Col$_1$. In this example, the GUI map is assumed to comprise 100 rows of pixels and 100 columns of pixels. This example of 100 rows and columns is presented for convenience of explanation; it is not a limitation of the invention. GUI maps according to embodiments of the present invention may include any number of pixels as will occur to those of skill in the art.

The illustrated area of the surface of the Earth has corresponding boundary points identified as Lat$_1$, Lon$_1$; Lat$_1$, Lon$_2$; Lat$_2$, Lon$_2$; and Lat$_2$, Lon$_1$. This example assumes that the distance along one side of surface area (504) is 100 nautical miles, so that the distance expressed in terms of latitude or longitude between boundary points of surface area (504) is 100 minutes or 1° 40'.

In typical embodiments, mapping a pixel's location on the GUI to Earth coordinates of a waypoint includes mapping pixel boundaries of the GUI map to Earth coordinates. In this example, the GUI map boundary at Row$_1$, Col$_1$ maps to the surface boundary point at Lat$_1$, Lon$_1$; the GUI map boundary at Row$_1$, Col$_2$ maps to the surface boundary point at Lat$_1$, Lon$_2$; the GUI map boundary at Row$_2$, Col$_2$ maps to the surface boundary point at Lat$_2$, Lon$_2$; the GUI map boundary at Row$_2$, Col$_1$ maps to the surface boundary point at Lat$_2$, Lon$_1$.

Mapping a pixel's location on the GUI to Earth coordinates of a waypoint typically also includes identifying a range of latitude and a range of longitude represented by each pixel. The range of latitude represented by each pixel may be described as (Lat$_2$–Lat$_1$)/N$_{rows}$, where (Lat$_2$–Lat$_1$) is the length in degrees of the vertical side of the corresponding surface (504), and N$_{rows}$ is the number of rows of pixels. In this example, (Lat$_2$–Lat$_1$) is 1° 40' or 100 nautical miles, and N$_{rows}$ is 100 rows of pixels. The range of latitude represented by each pixel in this example therefore is one minute of arc or one nautical mile.

Similarly, the range of longitude represented by each pixel may be described as (Lon$_2$–Lon$_1$)/N$_{cols}$, where (Lon$_2$–Lon$_1$) is the length in degrees of the horizontal side of the corresponding surface (504), and N$_{cols}$ is the number of columns of pixels. In this example, (Lon$_2$–Lon$_1$) is 1° 40' or 100 nautical miles, and N$_{cols}$ is 100 columns of pixels. The range of longitude represented by each pixel in this example therefore is one minute of arc or one nautical mile.

Mapping a pixel's location on the GUI to Earth coordinates of a waypoint typically also includes locating a region on the surface of the Earth in dependence upon the boundaries, the ranges, and the location of the pixel on the GUI map. The region is the portion of the surface corresponding the pixel itself. That region is located generally by multiplying in both dimension, latitude and longitude, the range of latitude and longitude by column or row numbers of the pixel location on the GUI map. That is, a latitude for the surface region of interest is given by Expression 1.

$$\text{Lat}_1 + P_{row}((\text{Lat}_2 - \text{Lat}_1)/N_{rows}) \quad \text{(Exp. 1)}$$

In Expression 1:
Lat$_1$ is the latitude of an origin point for the surface area (504) corresponding generally to the GUI map,
P$_{row}$ is the row number of the pixel location on the GUI map, and
((Lat$_2$–Lat$_1$)/N$_{rows}$) is the range of latitude represented by the pixel.

Similarly, a longitude for the surface region of interest is given by Expression 2.

$$\text{Lon}_1 + P_{col}((\text{Lon}_2 - \text{Lon}_1)/N_{cols}) \quad \text{(Exp.2)}$$

In Expression 2:
Lon$_1$ is the longitude of an origin point for the surface area (504) corresponding generally to the GUI map,
P$_{col}$ is the column number of the pixel location on the GUI map, and
((Lon$_2$–Lon$_1$)/N$_{cols}$) is the range of longitude represented by the pixel.

Referring to FIG. 5 for further explanation, Expressions 1 and 2 taken together identify a region (508) of surface area (504) that corresponds to the location of pixel (412) mapping the pixel location to the bottom left corner (506) of the region (508). Advantageously, however, many embodiments of the present invention further map the pixel to the center of the region by adding one half of the length of the region's sides to the location of the bottom left corner (506).

More particularly, locating a region on the surface of the Earth in dependence upon the boundaries, the ranges, and the location of the pixel on the GUI map, as illustrated by Expression 3, may include multiplying the range of longitude represented by each pixel by a column number of the selected pixel, yielding a first multiplicand; and multiplying the range of longitude represented by each pixel by 0.5, yielding a second multiplicand; adding the first and second multiplicands to an origin longitude of the GUI map.

$$\text{Lon}_1 + P_{col}((\text{Lon}_2 - \text{Lon}_1)/N_{cols}) + 0.5((\text{Lon}_2 - \text{Lon}_1)/N_{cols}) \quad \text{(Exp.3)}$$

In Expression 3, the range of longitude represented by each pixel is given by ((Lon$_2$–Lon$_1$)/N$_{cols}$), and the first multiplicand is P$_{col}$((Lon$_2$–Lon$_1$)/N$_{cols}$). The second multiplicand is given by 0.5((Lon$_2$–Lon$_1$)/N$_{cols}$).

Similarly, locating a region on the surface of the Earth in dependence upon the boundaries, the ranges, and the location of the pixel on the GUI map, as illustrated by Expression 4, typically also includes multiplying the range of latitude represented by each pixel by a row number of the selected pixel, yielding a third multiplicand; multiplying the range of latitude represented by each pixel by 0.5, yielding a fourth multiplicand; and adding the third and fourth multiplicands to an origin latitude of the GUI map.

$$\text{Lat}_1 + P_{row}((\text{Lat}_2 - \text{Lat}_1)/N_{rows}) + 0.5((\text{Lat}_2 - \text{Lat}_1)/N_{rows}) \quad \text{(Exp.4)}$$

In Expression 4, the range of latitude represented by each pixel is given by ((Lat$_2$–Lat$_1$)/N$_{rows}$), and the third multiplicand is P$_{row}$ ((Lat$_2$–Lat$_1$)/N$_{rows}$). The fourth multiplicand is given by 0.5((Lat$_2$–Lat$_1$)/N$_{rows}$). Expressions 3 and 4 taken together map the location of pixel (412) to the center (510) of the located region (508).

Navigation on a Heading to a Waypoint

Figure 6:
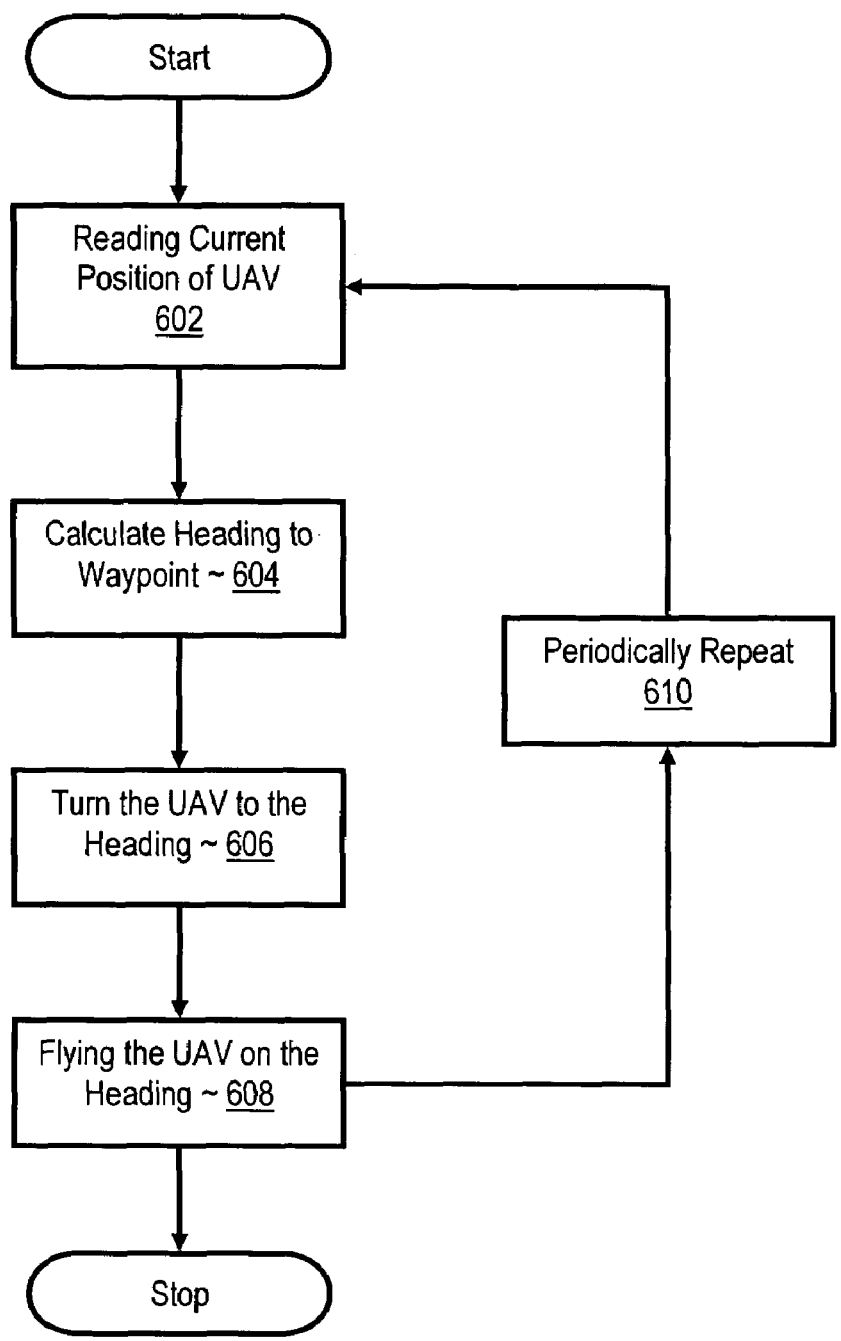
FIG. 6 sets forth a flow chart illustrating an exemplary method of piloting in accordance with a navigation algorithm.

An exemplary method of navigating in accordance with a navigation algorithm is explained with reference to FIGS. 6 and 7. FIG. 6 sets forth a flow chart illustrating an exemplary method of piloting in accordance with a navigation algorithm, and FIG. 7 sets forth a line drawing illustrating a flight path produced by application of the method of FIG. 6. The method of FIG. 6 includes periodically repeating (610) the steps of:
reading (602) from the GPS receiver a current position of the UAV;
calculating (604) a heading from the current position to the waypoint;

turning (606) the UAV to the heading; and flying (608) the UAV on the heading.

In this method, if $Lon_1$, $Lat_1$ is taken as the current position, and $Lon_2$, $Lat_2$ is taken as the waypoint position, then the heading may be calculated generally as the inverse tangent of $((Lat_2-Lat_1)/(Lon_2-Lon_1))$.

Figure 7:
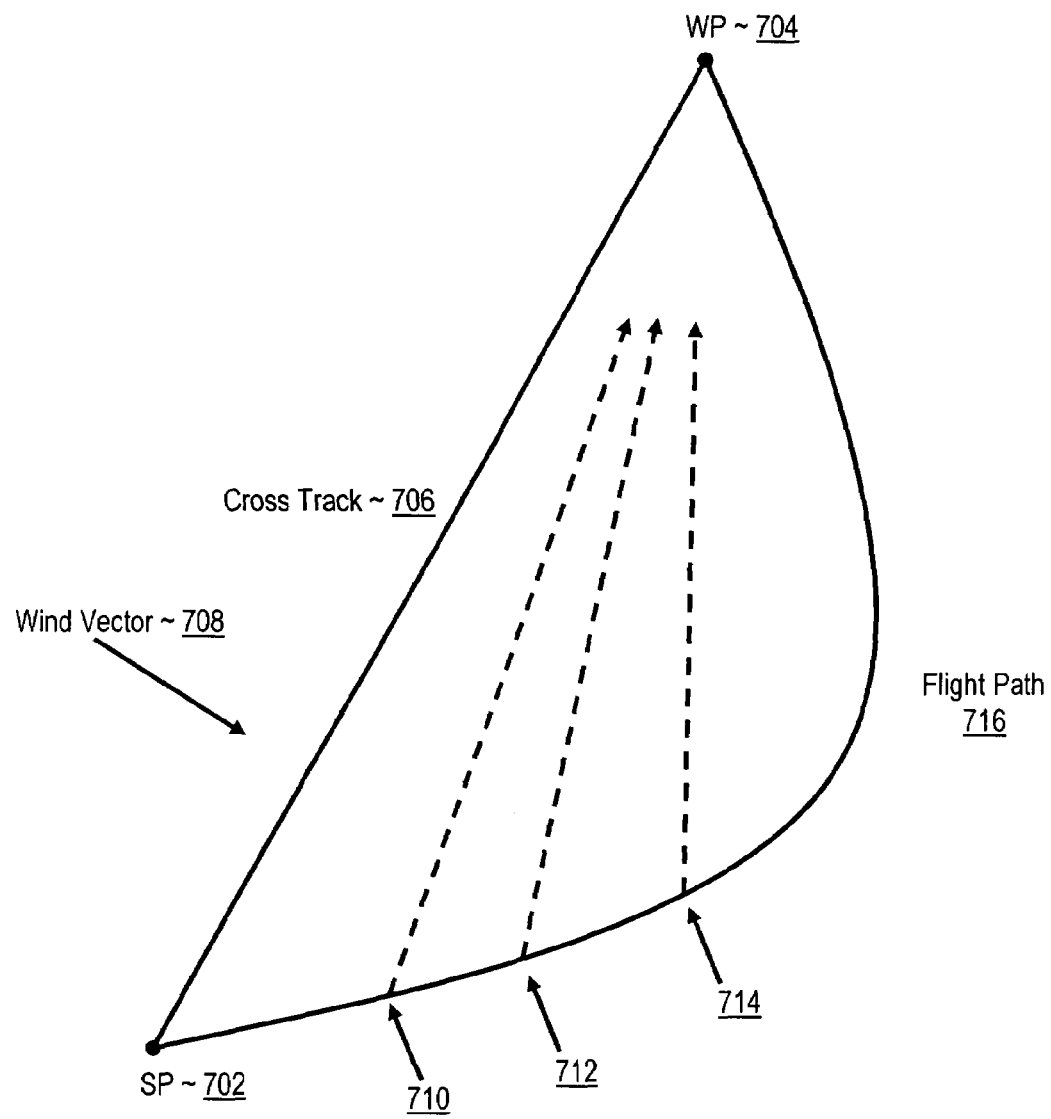
FIG. 7 sets forth a line drawing illustrating a flight path produced by application of the method of FIG. 6.

FIG. 7 shows the effect of the application of the method of FIG. 6. In the example of FIG. 7, a UAV is flying in a cross wind having cross wind vector (708). Curved flight path (716) results from periodic calculations according to the method of FIG. 6 of a new heading straight from a current location to the waypoint. FIG. 7 shows periodic repetitions of the method of FIG. 6 at plot points (710, 712, 714). For clarity of explanation, only three periodic repetitions are shown, although that is not a limitation of the invention. In fact, any number of periodic repetitions may be used as will occur to those of skill in the art.

Navigation with Headings Set to a Cross Track Direction

Figure 8:
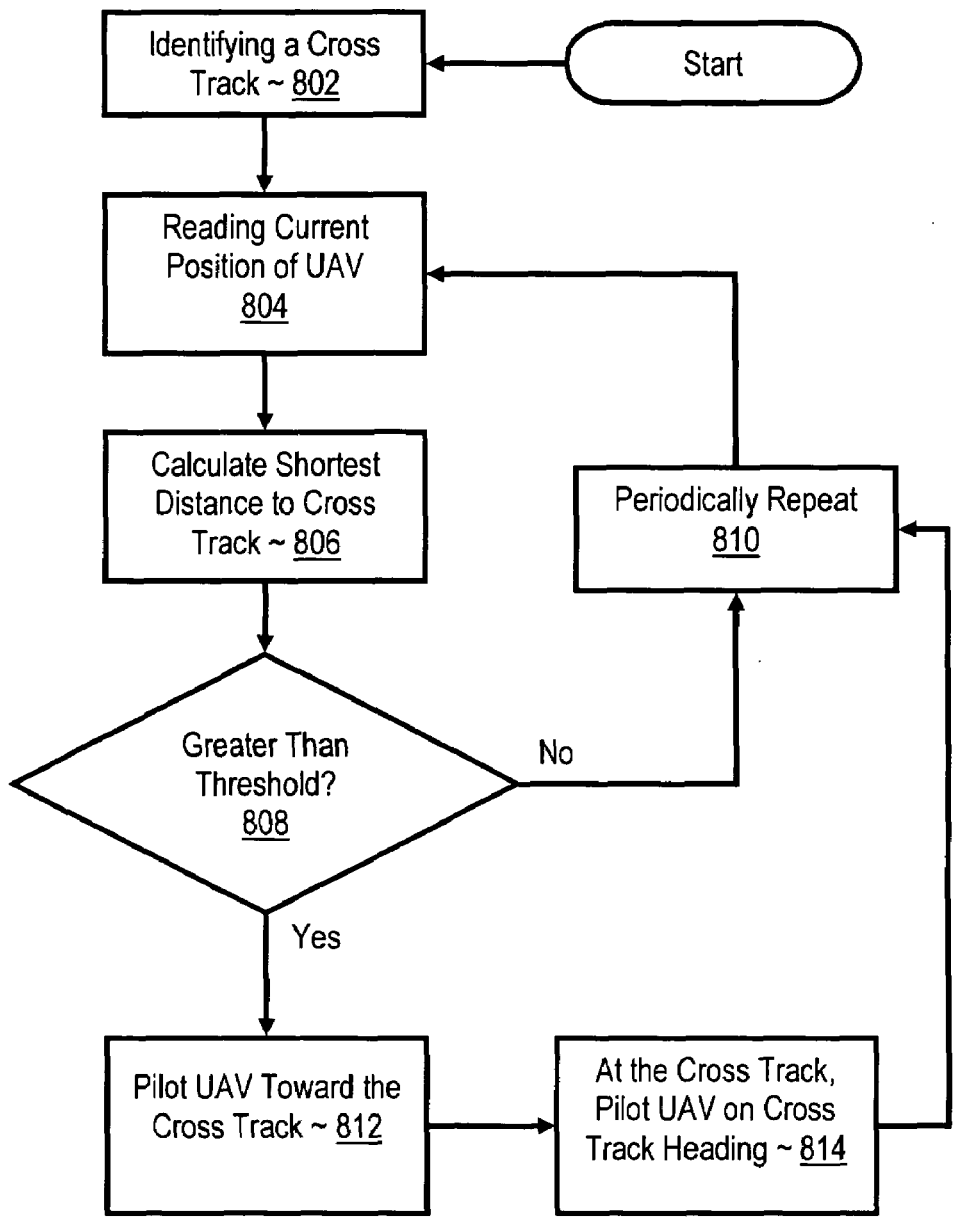
FIG. 8 sets forth a flow chart illustrating an exemplary method of piloting in accordance with a navigation algorithm.

A further exemplary method of navigating in accordance with a navigation algorithm is explained with reference to FIGS. 8 and 9. FIG. 8 sets forth a flow chart illustrating an exemplary method of piloting in accordance with a navigation algorithm, and FIG. 9 sets forth a line drawing illustrating a flight path produced by application of the method of FIG. 8.

The method of FIG. 8 includes identifying (802) a cross track between the starting point and the waypoint. A cross track is a fixed course from a starting point directly to a waypoint. If $Lon_1$, $Lat_1$ is taken as the position of a starting point, and $Lon_2$, $Lat_2$ is taken as the waypoint position, then a cross track is identified by $Lon_1$, $Lat_1$ and $Lon_2$, $Lat_2$. A cross track has a direction, a 'cross track direction,' that is the direction straight from a starting point to a waypoint, and it is often useful to characterize a cross track by its cross track direction. The cross track direction for a cross track identified by starting point $Lon_1$, $Lat_1$ and waypoint position $Lon_2$, $Lat_2$ may be calculated generally as the inverse tangent of $((Lat_2-Lat_1)/(Lon_2-Lon_1))$.

The method of FIG. 8 includes periodically repeating (810) the steps of: reading (804) from the GPS receiver a current position of the UAV; calculating (806) a shortest distance between the current position and the cross track; and if the shortest distance between the current position and the cross track is greater than a threshold distance, piloting (812) the UAV toward the cross track, and, upon arriving at the cross track, piloting (814) the UAV in a cross track direction toward the waypoint. FIG. 9 illustrates calculating a shortest distance between the current position and a cross track. In the example of FIG. 9, calculating a shortest distance between the current position and a cross track includes calculating the distance from a current position (912) to the waypoint (704). In the example of FIG. 9, the distance from the current position (912) to the waypoint (704) is represented as the length of line (914). For current position $Lon_1$, $Lat_1$ and waypoint position $Lon_2$, $Lat_2$, the distance from a current position (912) to the waypoint (704) is given by the square root of $(Lat_2-Lat_1)^2+(Lon_2-Lon_1)^2$.

In this example, calculating a shortest distance between the current position and a cross track also includes calculating the angle (910) between a direction from the current position to the waypoint and a cross track direction. In the example of FIG. 9, the direction from the current position (912) to the waypoint (704) is represented as the direction of line (914). In the example of FIG. 9, the cross track direction is the direction of cross track (706). The angle between a direction from the current position to the waypoint and a cross track direction is the difference between those directions.

In the current example, calculating a shortest distance between the current position and a cross track also includes calculating the tangent of the angle between a direction from the current position to the waypoint and a cross track direction and multiplying the tangent of the angle by the distance from the current position to the waypoint.

Figure 9:
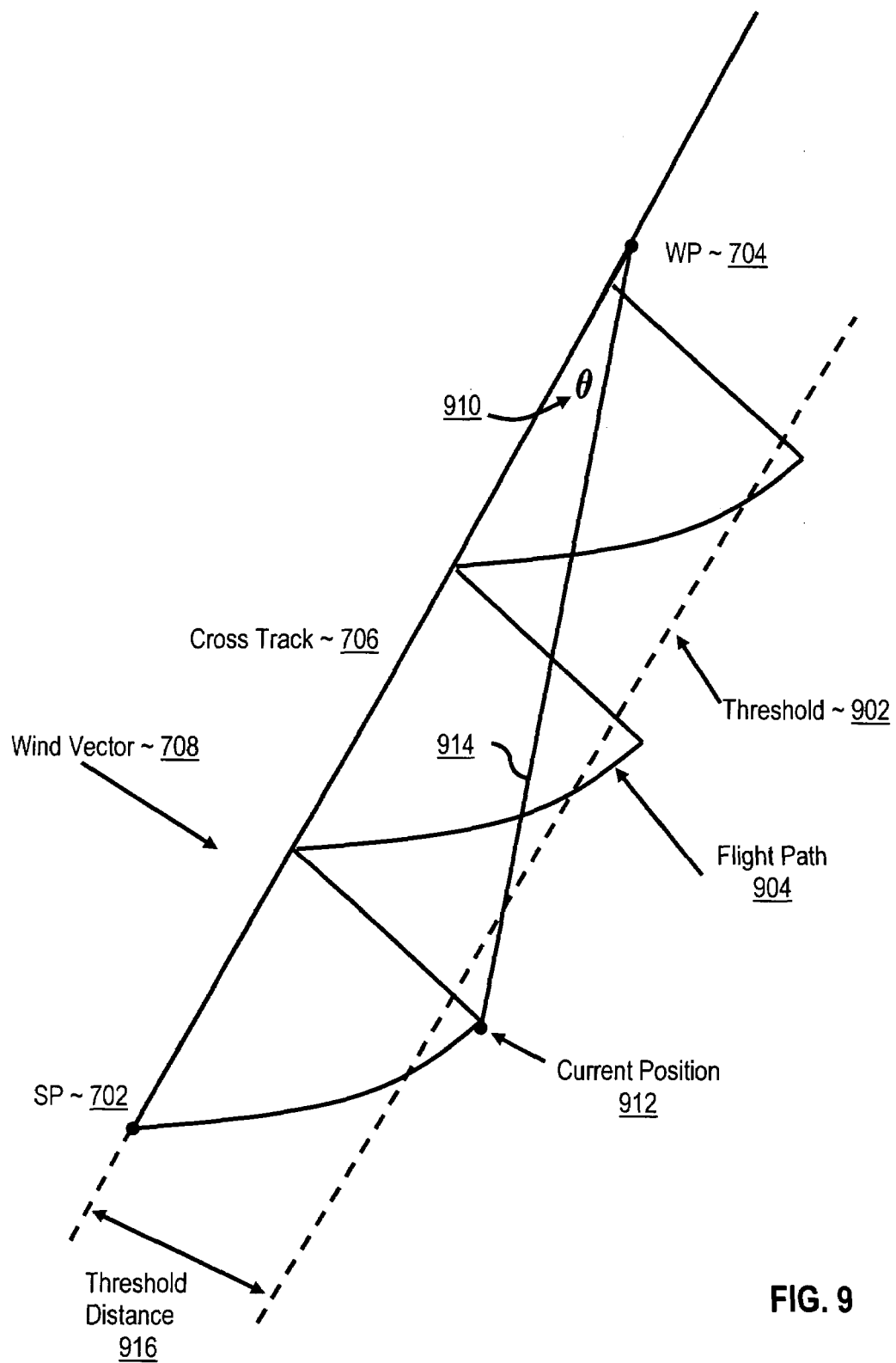
FIG. 9 sets forth a line drawing illustrating a flight path produced by application of the method of FIG. 8.

FIG. 9 also shows the effect of the application of the method of FIG. 8. In the example of FIG. 9, a UAV is flying in a cross wind having cross wind vector (708). Curved flight path (904) results from periodic calculations according to the method of FIG. 8 of a shortest distance between a current position and the cross track (706), flying the UAV back to the cross track and then in the direction of the cross track whenever the distance from the cross track exceeds a predetermined threshold distance.

Headings Set to Cross Track Direction with Angular Thresholds

Figure 10:
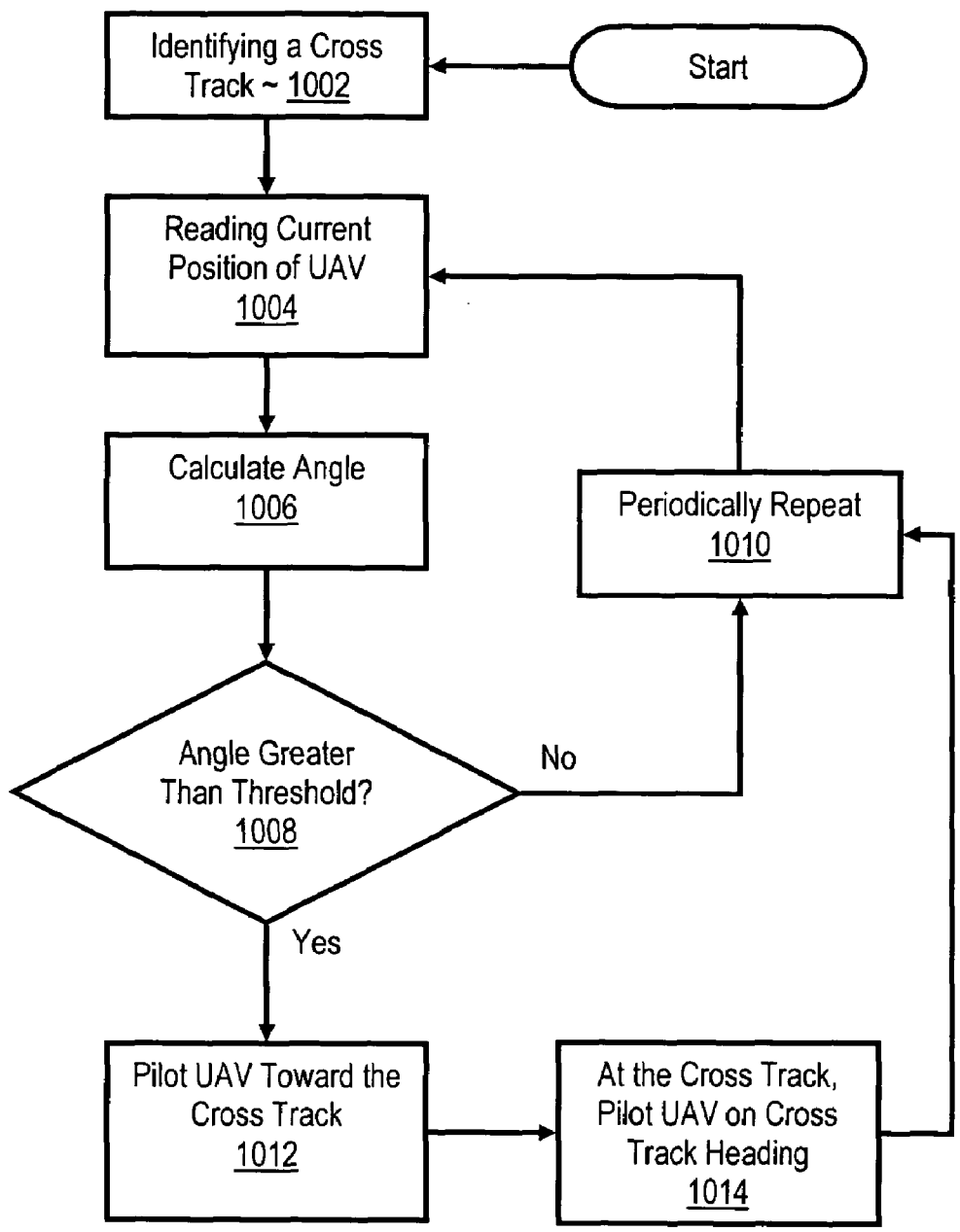
FIG. 10 sets forth a flow chart illustrating an exemplary method of piloting in accordance with a navigation algorithm.

A further exemplary method of navigating in accordance with a navigation algorithm is explained with reference to FIGS. 10 and 11. FIG. 10 sets forth a flow chart illustrating an exemplary method of piloting in accordance with a navigation algorithm, and FIG. 11 sets forth a line drawing illustrating a flight path produced by application of the method of FIG. 10.

In the method of FIG. 10, piloting in accordance with a navigation algorithm includes identifying (1002) a cross track having a cross track direction between the starting point and the waypoint. As described above, a cross track is identified by a position of a starting point and a waypoint position. For a starting point position of $Lon_1$, $Lat_1$ and a waypoint position of $Lon_2$, $Lat_2$, a cross track is identified by $Lon_1$, $Lat_1$ and $Lon_2$, $Lat_2$. In addition, it is often also useful to characterize a cross track by its cross track direction. The cross track direction for a cross track identified by starting point $Lon_1$, $Lat_1$ and waypoint position $Lon_2$, $Lat_2$ may be calculated generally as the inverse tangent of $((Lat_2-Lat_1)/(Lon_2-Lon_1))$.

In the method of FIG. 10, piloting in accordance with a navigation algorithm also includes repeatedly (1010) carrying out the steps of reading (1004) from the GPS receiver a current position of the UAV; calculating (1006) an angle between the direction from the current position to the waypoint and a cross track direction; and, if the angle is greater than a threshold angle, piloting (1012) the UAV toward the cross track, and, upon arriving at the cross track, piloting (1014) the UAV in the cross track direction. Piloting toward the cross track is carried out by turning to a heading no more than ninety degrees from the cross track direction, turning to the left if the current position is right of the cross track and to the right if the current position is left of the cross track. Piloting in the cross track direction means turning the UAV to the cross track direction and then flying straight and level on the cross track direction. That is, in piloting in the cross track direction, the cross track direction is set as the compass heading for the UAV.

Figure 11:
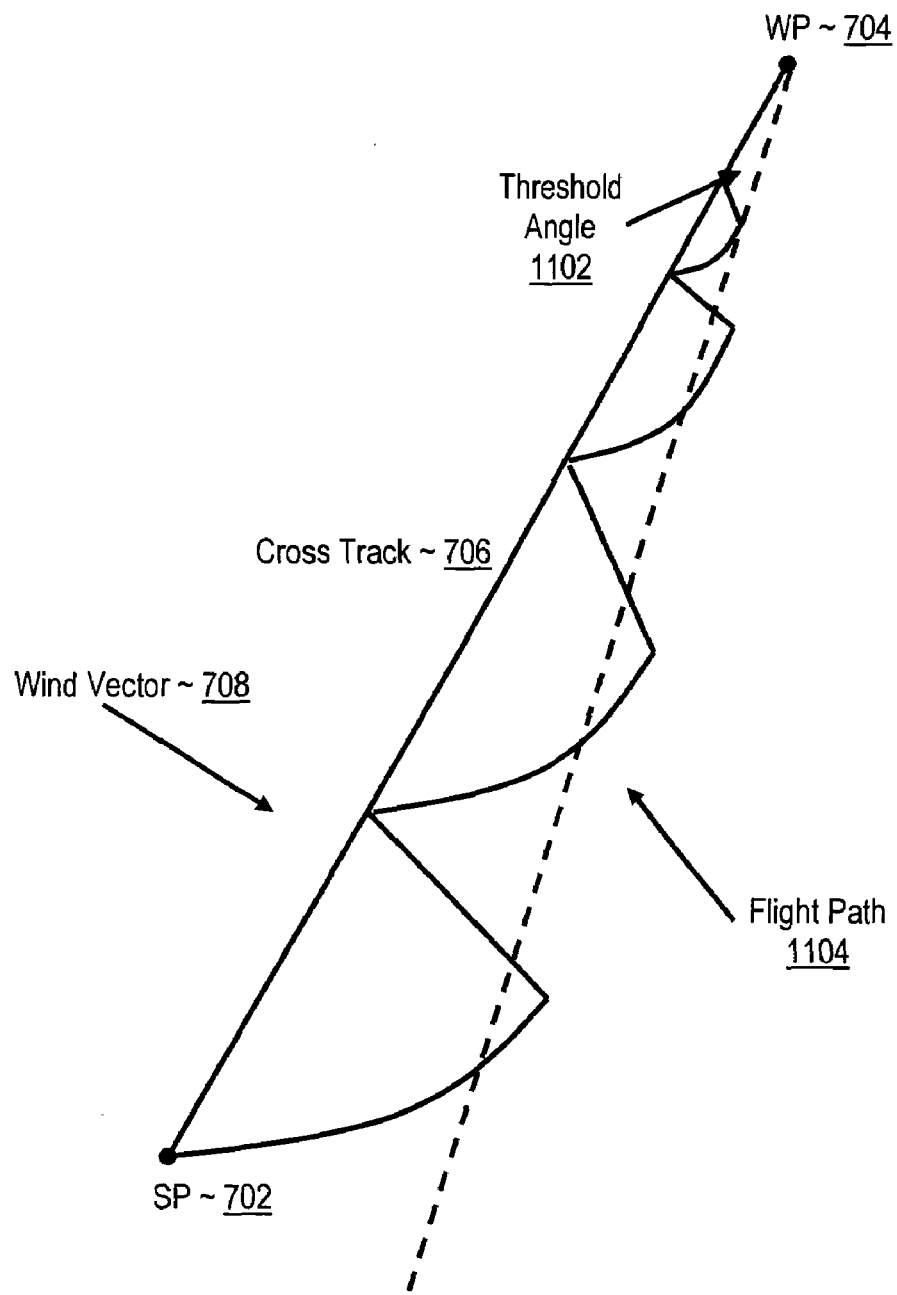
FIG. 11 sets forth a line drawing illustrating a flight path produced by application of the method of FIG. 10.

FIG. 11 shows the effect of the application of the method of FIG. 10. In the example of FIG. 11, a UAV is flying in a cross wind having cross wind vector (708). Curved flight path (1104) results from periodically flying the UAV, according to the method of FIG. 10, back to the cross track and then in the direction of the cross track whenever an angle between the direction from the current position to the waypoint and a cross track direction exceeds a predetermined threshold angle.

In many embodiments of the method of FIG. 10, the threshold angle is a variable whose value varies in dependence upon a distance between the UAV and the waypoint. In typical embodiments that vary the threshold angle, the threshold angle is increased as the UAV flies closer to the waypoint. It is useful to increase the threshold angle as the UAV flies closer to the waypoint to reduce the risk of excessive 'hunting' on the part of the UAV. That is, because the heading is the cross track direction, straight to the WP rather than cross-wind, if the angle remains the same, the distance that the UAV needs to be blown off course to trigger a return to the cross track gets smaller and smaller until the UAV is flying to the cross track, turning to the cross track direction, getting blown immediately across the threshold, flying back the cross track, turning to the cross track direction, getting blown immediately across the threshold, and so on, and so on, in rapid repetition. Increasing the threshold angle as the UAV flies closer to the waypoint increases the lateral distance available for wind error before triggering a return to the cross track, thereby reducing this risk of excessive hunting.

Navigation on a Course to a Waypoint

Figure 12:
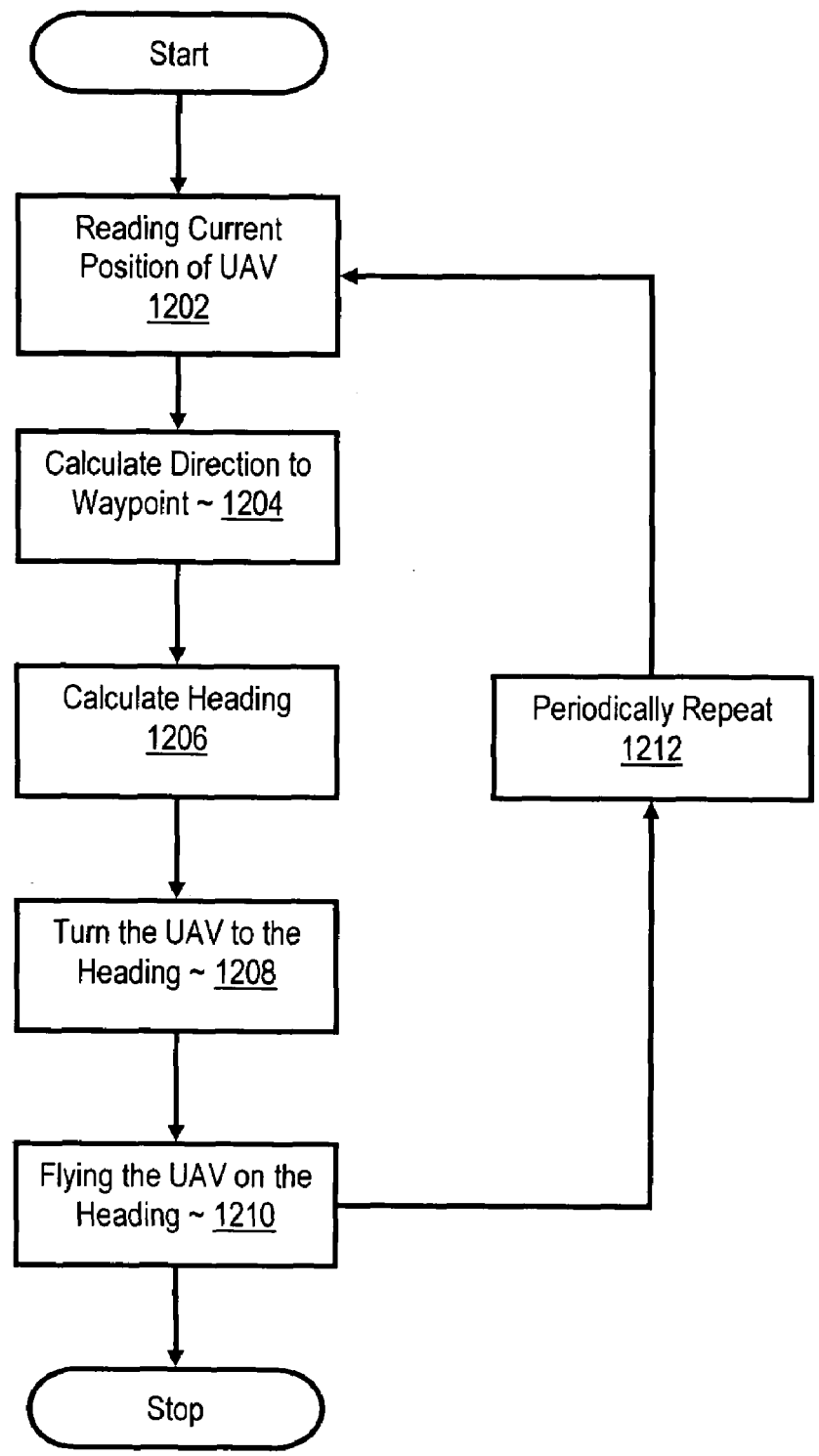
FIG. 12 sets forth a flow chart illustrating an exemplary method of piloting in accordance with a navigation algorithm.
Figure 12A:
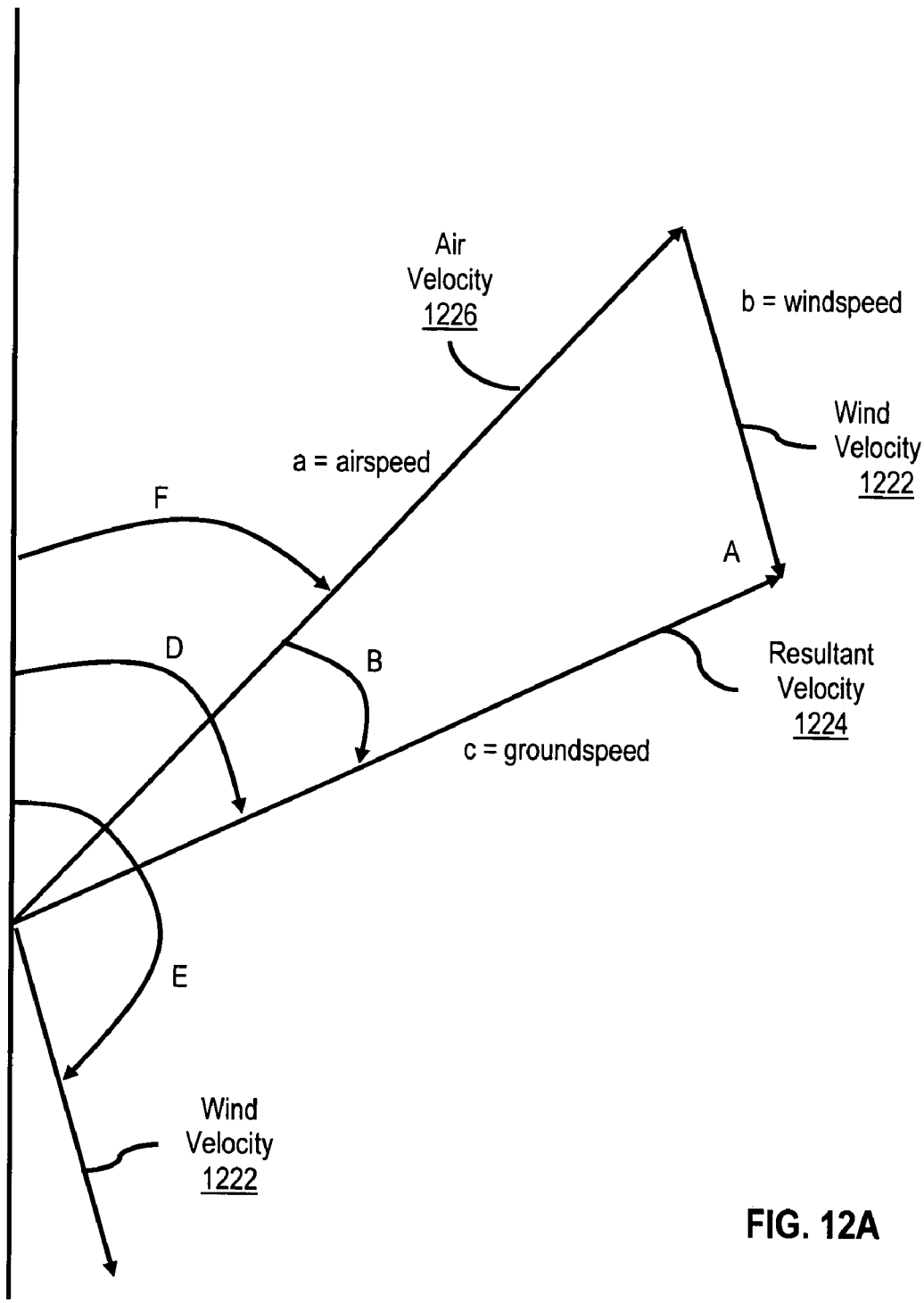
FIG. 12A sets forth a line drawing illustrating a method of calculating a heading with a cross wind to achieve a particular ground course.

A further exemplary method of navigating in accordance with a navigation algorithm is explained with reference to FIGS. 12, 12A, and 13. FIG. 12 sets forth a flow chart illustrating an exemplary method of piloting in accordance with a navigation algorithm. FIG. 12A sets forth a line drawing illustrating a method of calculating a heading with a cross wind to achieve a particular ground course. And FIG. 13 sets forth a line drawing illustrating a flight path produced by application of the method of FIG. 12.

In the method of FIG. 12, piloting in accordance with a navigation algorithm comprises periodically repeating (1212) the steps of reading (1202) from the GPS receiver a current position of the UAV; calculating (1204) a direction to the waypoint from the current position; calculating (1206) a heading in dependence upon wind speed, wind direction, air speed, and the direction to the waypoint; turning (1208) the UAV to the heading; and flying (1210) the UAV on the heading.

FIG. 12A illustrates calculating (1206) a heading in dependence upon wind speed, wind direction, air speed, and the direction to the waypoint. FIG. 12A sets forth a line drawing illustrating relations among several pertinent vectors, a wind velocity (1222), a resultant velocity (1224), and a UAV's air velocity (1226). A velocity vector includes a speed and a direction. These vectors taken together represent wind speed, wind direction, air speed, and the direction to the waypoint. In the example of FIG. 12A, the angle B is a so-called wind correction angle, an angle which subtracted from (or added to, depending on wind direction) a direction to a waypoint yields a heading, a compass heading for a UAV to fly so that is resultant ground course is on a cross track. A UAV traveling at an air speed of 'a' on heading (D-B) in the presence of a wind speed 'b' with wind direction E will have resultant ground speed 'c' in direction D.

In FIG. 12A, angle A represents the difference between the wind direction E and the direction to the waypoint D. In FIG. 12A, the wind velocity vector (1222) is presented twice, once to show the wind direction as angle E and again to illustrate angle A as the difference between angles E and D. Drawing wind velocity (1222) to form angle A with the resultant velocity (1224) also helps explain how to calculate wind correction angle B using the law of sines. Knowing two sides of a triangle and the angle opposite one of them, the angle opposite the other may be calculated, in this example, by $B=\sin^{-1}(b\,(\sin A)/a)$. The two known sides are airspeed 'a' and wind speed 'b.' The known angle is A, the angle opposite side 'a,' representing the difference between wind direction E and direction to the waypoint D. Calculating a heading, angle F on FIG. 12A, is then carried out by subtracting the wind correction angle B from the direction to the waypoint D.

Figure 13:
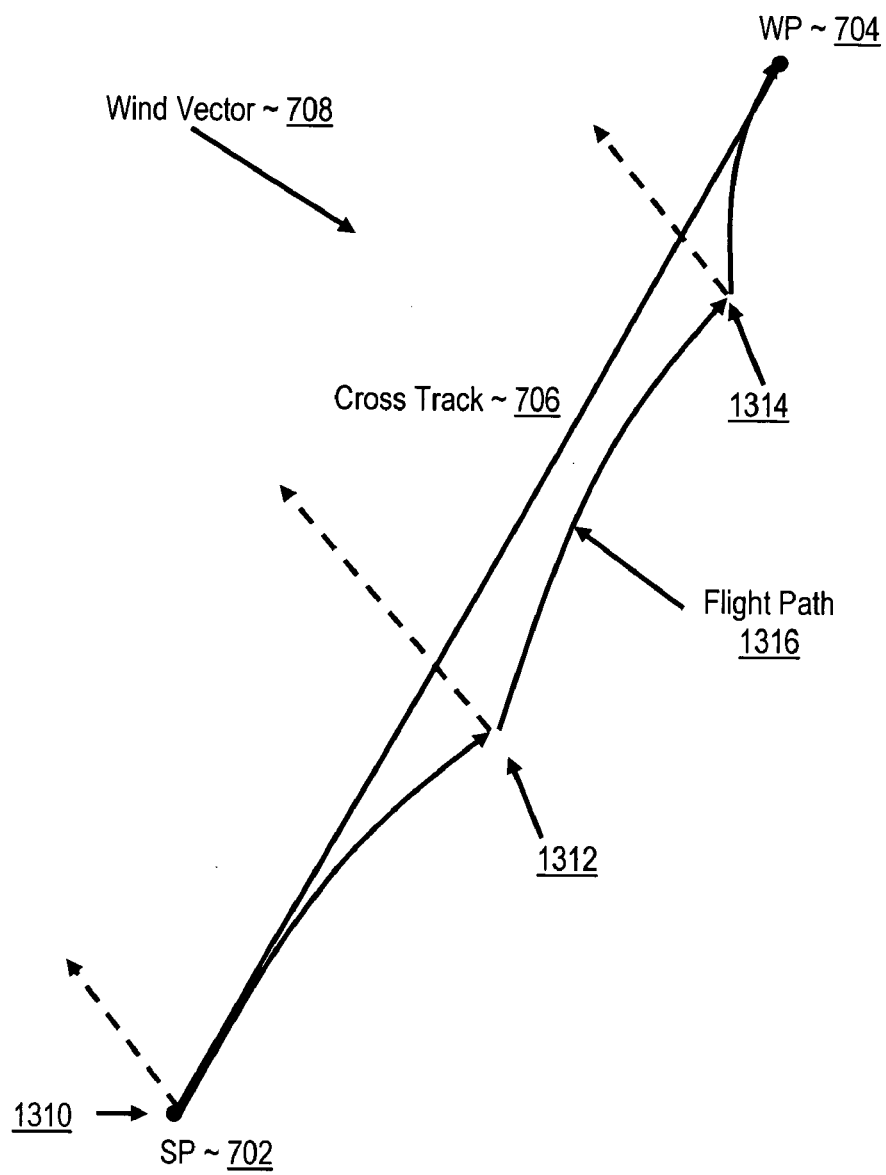
FIG. 13 sets forth a line drawing illustrating a flight path produced by application of the method of FIG. 12.

FIG. 13 shows the effect of the application of the method of FIG. 12. In the example of FIG. 13, a UAV is flying in a cross wind having cross wind vector (708). Curved flight path (1316) results from periodic calculations according to the method of FIG. 12 of a new heading straight whose resultant with a wind vector is a course straight from a current location to the waypoint. FIG. 13 shows periodic repetitions of the method of FIG. 12 at plot points (1310, 1312, 1314). For clarity of explanation, only three periodic repetitions are shown, although that is not a limitation of the invention. In fact, any number of periodic repetitions may be used as will occur to those of skill in the art.

Navigation on a Course Set to a Cross Track Direction

Figure 14:
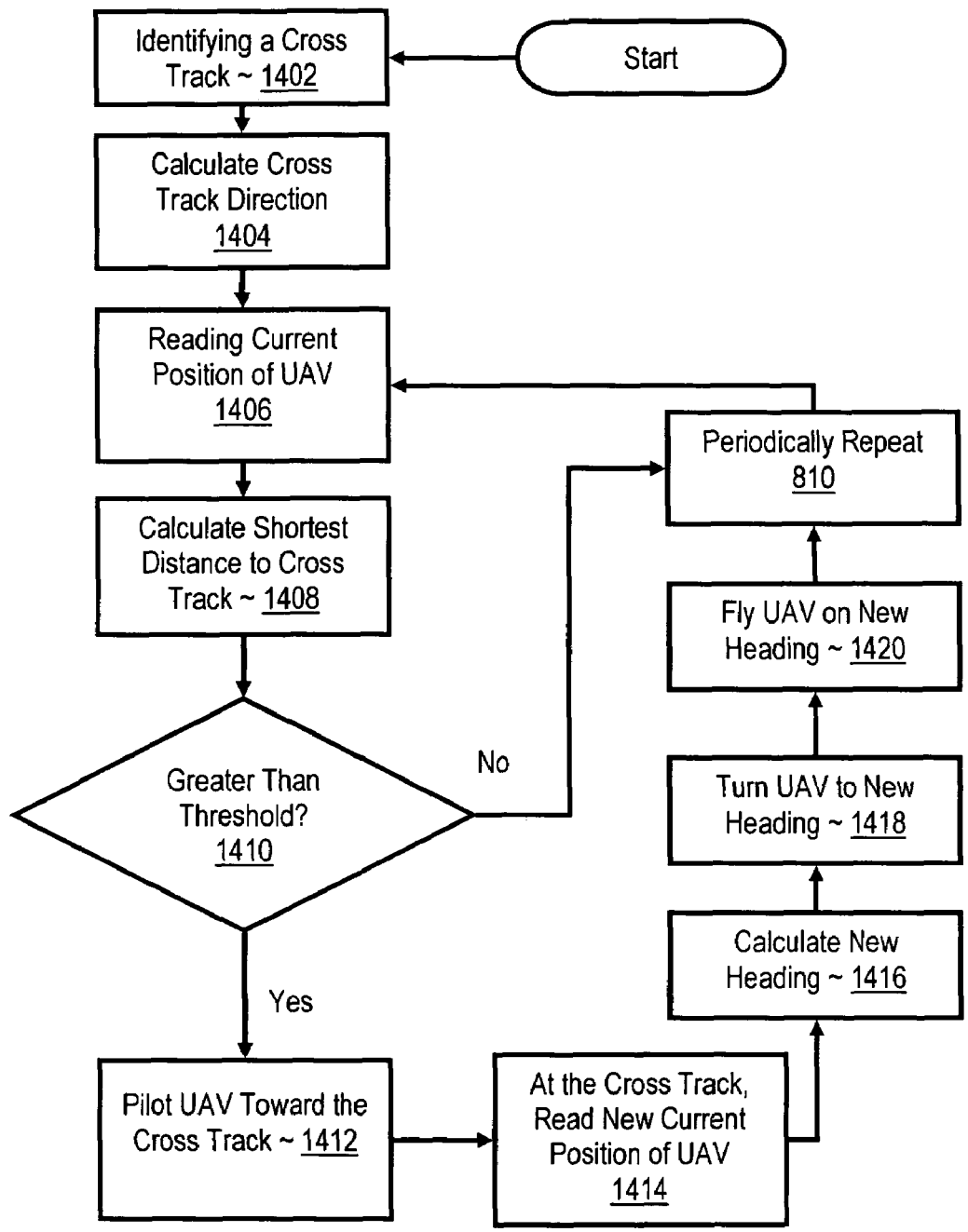
FIG. 14 sets forth a flow chart illustrating an exemplary method of piloting in accordance with a navigation algorithm.

A further exemplary method of navigating in accordance with a navigation algorithm is explained with reference to FIGS. 14 and 15. FIG. 14 sets forth a flow chart illustrating an exemplary method of piloting in accordance with a navigation algorithm, and FIG. 15 sets forth a line drawing illustrating a flight path produced by application of the method of FIG. 14.

The method of FIG. 14 includes identifying (1402) a cross track and calculating (1404) a cross track direction from the starting position to the waypoint. In the method of FIG. 14, piloting in accordance with a navigation algorithm is carried out by periodically repeating the steps of reading (1406) from the GPS receiver a current position of the UAV; calculating (1408) a shortest distance between the cross track and the current position; and, if the shortest distance between the cross track and the current position is greater than a threshold distance, piloting (1412) the UAV to the cross track. Upon arriving at the cross track, the method includes: reading (1414) from the GPS receiver a new current position of the UAV; calculating (1416), in dependence upon wind speed, wind direction, air speed, and the cross track direction, a new heading; turning (1418) the UAV to the new heading; and flying (1420) the UAV on the new heading.

Figure 15:
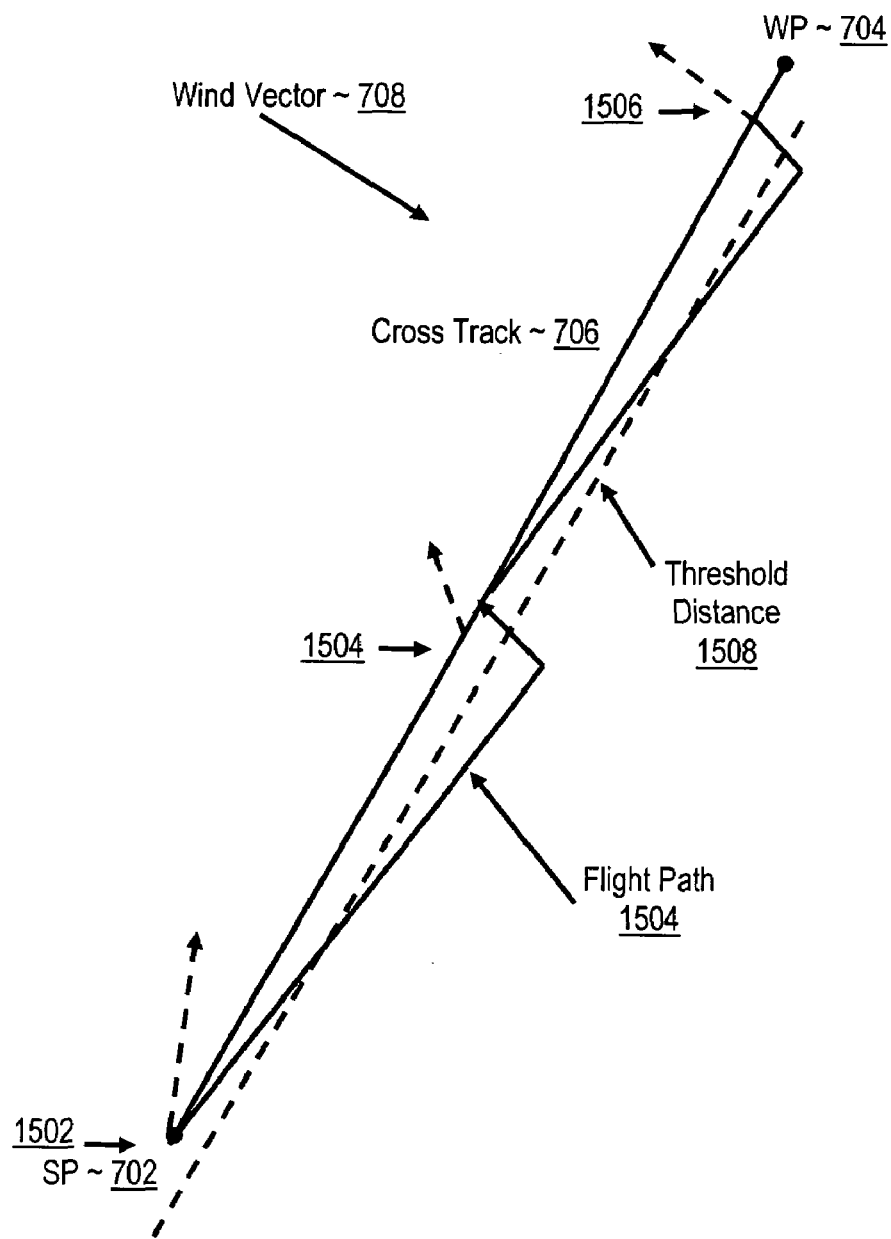
FIG. 15 sets forth a line drawing illustrating a flight path produced by application of the method of FIG. 14.

FIG. 15 shows the effect of the application of the method of FIG. 14. In the example of FIG. 15, a UAV is flying in a cross wind having cross wind vector (708). Curved flight path (1304) results from periodic calculations according to the method of FIG. 14 of a shortest distance between a current position and the cross track (706), flying the UAV back to the cross track, and, upon arriving at the cross track, calculating a new heading and flying the UAV on the new heading.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for navigating an unmanned aerial vehicle ("UAV"), the method comprising:
   receiving in a remote control device a user's selection of a GUI map pixel that represents a waypoint for UAV navigation, the pixel having a location on the GUI;
   mapping the pixel's location on the GUI to Earth coordinates of the waypoint;
   transmitting the coordinates of the waypoint to the UAV;
   reading a starting position from a GPS receiver on the UAV; and
   piloting the UAV, under control of a navigation computer on the UAV, from the starting position to the waypoint in accordance with a navigation algorithm.

2. The method of claim 1 further comprising:
   receiving user selections of a multiplicity of GUI map pixels representing waypoints, each pixel having a location on the GUI
   mapping each pixel location to Earth coordinates of a waypoint;
   assigning one or more UAV instructions to each waypoint;
   transmitting the coordinates of the waypoints and the UAV instructions to the UAV;
   storing the coordinates of the waypoints and the UAV instructions in computer memory on the UAV;
   piloting the UAV to each waypoint in accordance with one or more navigation algorithms; and
   operating the UAV at each waypoint in accordance with the UAV instructions for each waypoint.

3. The method of claim 1 wherein mapping the pixel's location on the GUI to Earth coordinates of the waypoint further comprises:
   mapping pixel boundaries of the GUI map to Earth coordinates;
   identifying a range of latitude and a range of longitude represented by each pixel; and
   locating a region on the surface of the Earth in dependence upon the boundaries, the ranges, and the location of the pixel on the GUI map.

4. The method of claim 3 wherein locating a region on the surface of the Earth in dependence upon the boundaries, the ranges, and the location of the pixel on the GUI map further comprises:
   multiplying the range of longitude represented by each pixel by a column number of the selected pixel, yielding a first multiplicand;
   multiplying the range of longitude represented by each pixel by 0.5, yielding a second multiplicand;
   adding the first and second multiplicands to an origin longitude of the GUI map;
   multiplying the range of latitude represented by each pixel by a row number of the selected pixel, yielding a third multiplicand;
   multiplying the range of latitude represented by each pixel by 0.5, yielding a fourth multiplicand; and
   adding the third and fourth multiplicands to an origin latitude of the GUI map.

5. The method of claim 1 wherein piloting in accordance with a navigation algorithm comprises periodically repeating the steps of:
   reading from the GPS receiver a current position of the UAV;
   calculating a heading from the current position to the waypoint;
   turning the UAV to the heading; and
   flying the UAV on the heading.

6. The method of claim 1 wherein piloting in accordance with a navigation algorithm comprises identifying a cross track between the starting point and the waypoint, and repeatedly carrying out the steps of:
   reading from the GPS receiver a current position of the UAV;
   calculating a shortest distance between the current position and the cross track; and
   if the shortest distance between the current position and the cross track is greater than a threshold distance, piloting the UAV toward the cross track, and, upon arriving at the cross track, piloting the UAV in a cross track direction toward the waypoint.

7. The method of claim 6 wherein calculating a shortest distance between the current position and the cross track comprises:
   calculating the distance from the current position to the waypoint;
   calculating the angle between a direction from the current position to the waypoint and a cross track direction;
   calculating the tangent of the angle; and
   multiplying the tangent of the angle by the distance from the current position to the waypoint.

8. The method of claim 1 wherein piloting in accordance with a navigation algorithm comprises identifying a cross track having a cross track direction between the starting point and the waypoint, and repeatedly carrying out the steps of:
   reading from the GPS receiver a current position of the UAV;
   calculating an angle between the direction from the current position to the waypoint and a cross track direction; and
   if the angle is greater than a threshold angle, piloting the UAV toward the cross track, and, upon arriving at the cross track, piloting the UAV in the cross track direction.

9. The method of claim 8 wherein the threshold angle is a variable whose value varies in dependence upon a distance between the UAV and the waypoint.

10. The method of claim 1 wherein piloting in accordance with a navigation algorithm comprises periodically repeating the steps of:
    reading from the GPS receiver a current position of the UAV;
    calculating a direction to the waypoint from the current position;
    calculating a heading in dependence upon wind speed, wind direction, air speed, and the direction to the waypoint;
    turning the UAV to the heading; and
    flying the UAV on the heading.

11. The method of claim 1 further comprising identifying a cross track and calculating a cross track direction from the starting position to the waypoint, and piloting in accordance with a navigation algorithm comprises periodically repeating the steps of:
    reading from the GPS receiver a current position of the UAV;
    calculating a shortest distance between the cross track and the current position; and
    if the shortest distance between the cross track and the current position is greater than a threshold distance, piloting the UAV to the cross track, and, upon arriving at the cross track:

reading from the GPS receiver a new current position of the UAV;

calculating, in dependence upon wind speed, wind direction, air speed, and the cross track direction, a new heading;

turning the UAV to the new heading; and flying the UAV on the new heading.

12. A system for navigating an unmanned aerial vehicle ("UAV"), the system comprising:

means for receiving in a remote control device a user's selection of a GUI map pixel that represents a waypoint for UAV navigation, the pixel having a location on the GUI;

means for mapping the pixel's location on the GUI to Earth coordinates of the waypoint;

means for transmitting the coordinates of the waypoint to the UAV;

means for reading a starting position from a GPS receiver on the UAV; and means for piloting the UAV, under control of a navigation computer on the UAV, from the starting position to the waypoint in accordance with a navigation algorithm.

13. The system of claim 12 further comprising:

means for receiving user selections of a multiplicity of GUI map pixels representing waypoints, each pixel having a location on the GUI means for mapping each pixel location to Earth coordinates of a waypoint;

means for assigning one or more UAV instructions to each waypoint;

means for transmitting the coordinates of the waypoints and the UAV instructions to the UAV;

means for storing the coordinates of the waypoints and the UAV instructions in computer memory on the UAV;

means for piloting the UAV to each waypoint in accordance with one or more navigation algorithms; and means for operating the UAV at each waypoint in accordance with the UAV instructions for each waypoint.

14. The system of claim 12 wherein means for mapping the pixel's location on the GUI to Earth coordinates of the waypoint further comprises:

means for mapping pixel boundaries of the GUI map to Earth coordinates;

means for identifying a range of latitude and a range of longitude represented by each pixel; and means for locating a region on the surface of the Earth in dependence upon the boundaries, the ranges, and the location of the pixel on the GUI map.

15. The system of claim 14 wherein means for locating a region on the surface of the Earth in dependence upon the boundaries, the ranges, and the location of the pixel on the GUI map further comprises:

means for multiplying the range of longitude represented by each pixel by a column number of the selected pixel, yielding a first multiplicand;

means for multiplying the range of longitude represented by each pixel by 0.5, yielding a second multiplicand;

means for adding the first and second multiplicands to an origin longitude of the GUI map;

means for multiplying the range of latitude represented by each pixel by a row number of the selected pixel, yielding a third multiplicand;

means for multiplying the range of latitude represented by each pixel by 0.5, yielding a fourth multiplicand; and means for adding the third and fourth multiplicands to an origin latitude of the GUI map.

16. The system of claim 12 wherein means for piloting in accordance with a navigation algorithm comprises:

means for reading from the GPS receiver a current position of the UAV;

means for calculating a heading from the current position to the waypoint;

means for turning the UAV to the heading; and means for flying the UAV on the heading.

17. The system of claim 12 wherein means for piloting in accordance with a navigation algorithm comprises means for identifying a cross track between the starting point and the waypoint, and:

means for reading from the GPS receiver a current position of the UAV;

means for calculating a shortest distance between the current position and the cross track; and means for piloting the UAV toward the cross track, means for piloting the UAV in a cross track direction toward the waypoint.

18. The system of claim 17 wherein means for calculating a shortest distance between the current position and the cross track comprises:

means for calculating the distance from the current position to the waypoint;

means for calculating the angle between a direction from the current position to the waypoint and a cross track direction;

means for calculating the tangent of the angle; and means for multiplying the tangent of the angle by the distance from the current position to the waypoint.

19. The system of claim 12 wherein means for piloting in accordance with a navigation algorithm comprises means for identifying a cross track having a cross track direction between the starting point and the waypoint, and:

means for reading from the GPS receiver a current position of the UAV;

means for calculating an angle between the direction from the current position to the waypoint and a cross track direction; and means for piloting the UAV toward the cross track, and means for piloting the UAV in the cross track direction.

20. The system of claim 19 wherein the threshold angle is a variable whose value varies in dependence upon a distance between the UAV and the waypoint.

21. The system of claim 12 wherein means for piloting in accordance with a navigation algorithm comprises:

means for reading from the GPS receiver a current position of the UAV;

means for calculating a direction to the waypoint from the current position;

means for calculating a heading in dependence upon wind speed, wind direction, air speed, and the direction to the waypoint;

means for turning the UAV to the heading; and means for flying the UAV on the heading.

22. The system of claim 12 further comprising means for identifying a cross track and calculating a cross track direction from the starting position to the waypoint, and means for piloting in accordance with a navigation algorithm comprises:

means for reading from the GPS receiver a current position of the UAV;

means for calculating a shortest distance between the cross track and the current position; and means for piloting the UAV to the cross track; and means for reading from the GPS receiver a new current position of the UAV;

means for calculating, in dependence upon wind speed, wind direction, air speed, and the cross track direction, a new heading;

means for turning the UAV to the new heading; and means for flying the UAV on the new heading.

23. A computer program product for navigating an unmanned aerial vehicle ("UAV"), the computer program product comprising:

a recording medium;

means, recorded on the recording medium, for receiving in a remote control device a user's selection of a GUI map pixel that represents a waypoint for UAV navigation, the pixel having a location on the GUI;

means, recorded on the recording medium, for mapping the pixel's location on the GUI to Earth coordinates of the waypoint;

means, recorded on the recording medium, for transmitting the coordinates of the waypoint to the UAV;

means, recorded on the recording medium, for reading a starting position from a GPS receiver on the UAV; and means, recorded on the recording medium, for piloting the UAV, under control of a navigation computer on the UAV, from the starting position to the waypoint in accordance with a navigation algorithm.

24. The computer program product of claim 23 further comprising:

means, recorded on the recording medium, for receiving user selections of a multiplicity of GUI map pixels representing waypoints, each pixel having a location on the GUI means, recorded on the recording medium, for mapping each pixel location to Earth coordinates of a waypoint;

means, recorded on the recording medium, for assigning one or more UAV instructions to each waypoint;

means, recorded on the recording medium, for transmitting the coordinates of the waypoints and the UAV instructions to the UAV;

means, recorded on the recording medium, for storing the coordinates of the waypoints and the UAV instructions in computer memory on the UAV;

means, recorded on the recording medium, for piloting the UAV to each waypoint in accordance with one or more navigation algorithms; and means, recorded on the recording medium, for operating the UAV at each waypoint in accordance with the UAV instructions for each waypoint.

25. The computer program product of claim 23 wherein means, recorded on the recording medium, for mapping the pixel's location on the GUI to Earth coordinates of the waypoint further comprises:

means, recorded on the recording medium, for mapping pixel boundaries of the GUI map to Earth coordinates;

means, recorded on the recording medium, for identifying a range of latitude and a range of longitude represented by each pixel; and means, recorded on the recording medium, for locating a region on the surface of the Earth in dependence upon the boundaries, the ranges, and the location of the pixel on the GUI map.

26. The computer program product of claim 24 wherein means, recorded on the recording medium, for locating a region on the surface of the Earth in dependence upon the boundaries, the ranges, and the location of the pixel on the GUI map further comprises:

means, recorded on the recording medium, for multiplying the range of longitude represented by each pixel by a column number of the selected pixel, yielding a first multiplicand;

means, recorded on the recording medium, for multiplying the range of longitude represented by each pixel by 0.5, yielding a second multiplicand;

means, recorded on the recording medium, for adding the first and second multiplicands to an origin longitude of the GUI map;

means, recorded on the recording medium, for multiplying the range of latitude represented by each pixel by a row number of the selected pixel, yielding a third multiplicand;

means, recorded on the recording medium, for multiplying the range of latitude represented by each pixel by 0.5, yielding a fourth multiplicand; and means, recorded on the recording medium, for adding the third and fourth multiplicands to an origin latitude of the GUI map.

27. The computer program product of claim 23 wherein means, recorded on the recording medium, for piloting in accordance with a navigation algorithm comprises:

means, recorded on the recording medium, for reading from the GPS receiver a current position of the UAV;

means, recorded on the recording medium, for calculating a heading from the current position to the waypoint;

means, recorded on the recording medium, for turning the UAV to the heading; and means, recorded on the recording medium, for flying the UAV on the heading.

28. The computer program product of claim 23 wherein means, recorded on the recording medium, for piloting in accordance with a navigation algorithm comprises means, recorded on the recording medium, for identifying a cross track between the starting point and the waypoint, and:

means, recorded on the recording medium, for reading from the GPS receiver a current position of the UAV;

means, recorded on the recording medium, for calculating a shortest distance between the current position and the cross track; and means, recorded on the recording medium, for piloting the UAV toward the cross track, means, recorded on the recording medium, for piloting the UAV in a cross track direction toward the waypoint.

29. The computer program product of claim 28 wherein means, recorded on the recording medium, for calculating a shortest distance between the current position and the cross track comprises:

means, recorded on the recording medium, for calculating the distance from the current position to the waypoint;

means, recorded on the recording medium, for calculating the angle between a direction from the current position to the waypoint and a cross track direction;

means, recorded on the recording medium, for calculating the tangent of the angle; and means, recorded on the recording medium, for multiplying the tangent of the angle by the distance from the current position to the waypoint.

30. The computer program product of claim 23 wherein means, recorded on the recording medium, for piloting in accordance with a navigation algorithm comprises means, recorded on the recording medium, for identifying a cross track having a cross track direction between the starting point and the waypoint, and:
  means, recorded on the recording medium, for reading from the GPS receiver a current position of the UAV;
  means, recorded on the recording medium, for calculating an angle between the direction from the current position to the waypoint and a cross track direction; and
  means, recorded on the recording medium, for piloting the UAV toward the cross track, and
  means, recorded on the recording medium, for piloting the UAV in the cross track direction.

31. The computer program product of claim 30 wherein the threshold angle is a variable whose value varies in dependence upon a distance between the UAV and the waypoint.

32. The computer program product of claim 23 wherein means, recorded on the recording medium, for piloting in accordance with a navigation algorithm comprises:
  means, recorded on the recording medium, for reading from the GPS receiver a current position of the UAV;
  means, recorded on the recording medium, for calculating a direction to the waypoint from the current position;
  means, recorded on the recording medium, for calculating a heading in dependence upon wind speed, wind direction, air speed, and the direction to the waypoint;
  means, recorded on the recording medium, for turning the UAV to the heading; and
  means, recorded on the recording medium, for flying the UAV on the heading.

33. The computer program product of claim 23 further comprising means, recorded on the recording medium, for identifying a cross track and calculating a cross track direction from the starting position to the waypoint, and means, recorded on the recording medium, for piloting in accordance with a navigation algorithm comprises:
  means, recorded on the recording medium, for reading from the GPS receiver a current position of the UAV;
  means, recorded on the recording medium, for calculating a shortest distance between the cross track and the current position; and
  means, recorded on the recording medium, for piloting the UAV to the cross track; and
  means, recorded on the recording medium, for reading from the GPS receiver a new current position of the UAV;
  means, recorded on the recording medium, for calculating, in dependence upon wind speed, wind direction, air speed, and the cross track direction, a new heading;
  means, recorded on the recording medium, for turning the UAV to the new heading; and
  means, recorded on the recording medium, for flying the UAV on the new heading.

* * * * *